(12) United States Patent
Tuvell et al.

(10) Patent No.: US 7,171,001 B2
(45) Date of Patent: Jan. 30, 2007

(54) METHOD AND APPARATUS FOR MANAGING SECURE COLLABORATIVE TRANSACTIONS

(75) Inventors: Walter Tuvell, Reading, MA (US); Nimisha Asthagiri, Pasadena, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/257,239

(22) Filed: Oct. 24, 2005

(65) Prior Publication Data

US 2006/0036862 A1    Feb. 16, 2006

Related U.S. Application Data

(62) Division of application No. 09/571,851, filed on May 12, 2000, now Pat. No. 6,986,046.

(51) Int. Cl.
    *H04L 9/08*    (2006.01)
(52) U.S. Cl. ........................ 380/278; 713/163
(58) Field of Classification Search ............... 380/278, 380/273, 281, 283, 284; 713/163, 191
    See application file for complete search history.

(56) References Cited

U.S. PATENT DOCUMENTS

| | | | |
|---|---|---|---|
| 5,787,175 A | | 7/1998 | Carter |
| 6,049,878 A | * | 4/2000 | Caronni et al. ............... 726/3 |
| 6,052,787 A | | 4/2000 | Euchner et al. |

(Continued)

FOREIGN PATENT DOCUMENTS

EP    0 889 617 A2    1/1999

(Continued)

OTHER PUBLICATIONS

Cannetti, R., et al., *Milticast Security: A Taxonomy and Some Efficient Construction*, Eighteenth Annual Joint Conference of the IEEE Computer and Communications Societies Proceedings, Mar. 1999, pp. 708-716, New York, NY and Piscataway, NJ.

(Continued)

*Primary Examiner*—Matthew Smithers
(74) *Attorney, Agent, or Firm*—Wolf, Greenfield & Sacks, P.C.

(57) ABSTRACT

Different levels of security are provided in a security system so that users can decide the security level of their own communications. Users can choose a low level of security and maintain the security overhead as low as possible. Alternatively, they can choose higher levels of security with attendant increases in security overhead. The different levels of security are created by the use of one or more of two keys: an encryption key is used to encrypt plaintext data in a delta and a message authentication key is used to authenticate and insure integrity of the data. Two keys are used to avoid re-encrypting the encrypted data for each member of the telespace. In one embodiment, the security level is determined when a telespace is created and remains fixed through out the life of the telespace. For a telespace, the security level may range from no security at all to security between the members of the telespace and outsiders to security between pairs of members of the telespace. In another embodiment, subgroups called "tribes" can be formed within a telespace and each tribe adopts the security level of the telespace in which it resides.

11 Claims, 17 Drawing Sheets

U.S. PATENT DOCUMENTS

| | | |
|---|---|---|
| 6,295,361 B1* | 9/2001 | Kadansky et al. .......... 380/278 |
| 6,453,327 B1 | 9/2002 | Nielsen |
| 6,584,566 B1* | 6/2003 | Hardjono .................... 713/163 |
| 6,606,706 B1* | 8/2003 | Li .............................. 713/162 |

FOREIGN PATENT DOCUMENTS

| | | |
|---|---|---|
| EP | 0 952 718 A2 | 10/1999 |

OTHER PUBLICATIONS

Press, J, *Object Oriented Cryptographic Facility Design: Export Considerations*, International Journal Devoted to the Study of Technical and Financial Aspects of Computer Security, Elsevier Science Publishers, vol. 15, No. 6, pp. 507-514, Amsterdam, The Netherlands.

Bruce Schneier, *Applied Cryptography*, 1996, Wiley & Sons, Second Edition, pp. 33.

Rowley, Andrew, *A security Architecture for Distributed Groupware*, Department of Computer Science of Queen Mary and Westfield College, University of London, pp. 1-142, Sep. 1998.

Gong Li, *New Protocols for Third-Party-Based Authentication and Secure Broadcast*, 1994 ACM, pp. 176-183.

Gong Li, *Enclaves: Enabling Secure Collaboration Over the Internet*, 1006 Usenix, pp. 1-11.

Ellison, Carl M., *The Nature of a Useable PKI, Computer Networks*, pp. 823-830, vol. 31, Elsevier Scine B.V.

Abadi, et al., "Prudent Engineering Practice for Cryptographic Protocols," IEEE Transactions on Software Engineering, vol. 22, No. 1 Jan. 1996, pp. 6-15.

Press, J., "A New Approach to Cryptographic Facility Design", ICL Technical Journal, May 1993, pp. 492-504.

Extended European Search Report issued in EP06013559.7, Oct. 25, 2006, 5 pages.

* cited by examiner

FIG. 11

| HEADER | INVITEE NAME | SIGNED NONCE | CRYPTO DATA | PUBLIC-KEY ENCRYPTED ONE-TIME KEY INFO | INVITATION INFO ENCRYPTED WITH ONE-TIME KEY | CHAIR SIGNATURE | CHAIR CERTIFICATE |
|---|---|---|---|---|---|---|---|
| 1100 | 1102 | 1104 | 1106 | 1108 | 1110 | 1112 | 1114 |

FIG. 12

| HEADER | SIGNED NONCE | SIGNED NONCE | CRYPTO DATA | PUBLIC-KEY ENCRYPTED ONE-TIME KEY INFO | ACCEPT INFO ENCRYPTED WITH ONE-TIME KEY | INVITEE SIGNATURE | INVITEE CERTIFICATE |
|---|---|---|---|---|---|---|---|
| 1200 | 1202 | 1204 | 1206 | 1208 | 1210 | 1212 | 1214 |

FIG. 13

| HEADER | AGGREGATED KEY VERSION INFO | AGGREGATED GROUP RE-KEY INFO | ENCRYPTED JOIN DELTA INFORMATION | MAC |
|---|---|---|---|---|
| 1300 | 1302 | 1304 | 1306 | 1308 |

METHOD AND APPARATUS FOR MANAGING SECURE COLLABORATIVE TRANSACTIONS

CROSS REFERENCE TO RELATED APPLICATIONS

This application is a division of prior application Ser. No. 09/571,851, filed on May 12, 2000 now U.S. Pat. 6,986,046, entitled Method And Apparatus For Managing Secure Collaborative Transactions now allowed, which is herein incorporated by reference in its entirety.

FIELD OF THE INVENTION

This invention relates to methods and apparatus for providing secure data exchange transactions and, in particular, to methods and apparatus for providing secure data exchange transactions in a collaborative environment.

BACKGROUND OF THE INVENTION

Current computing applications are largely single user systems. For example, conventional editing applications allow a single user to open a file and make modifications to the content. If while the file is open by a first user, a second user attempts to open the file, the second user will be prevented from opening or modifying the file. The second user is sometimes permitted to obtain a snapshot copy of the file.

The snapshot copy, however, is not updated with any of the subsequent modifications made to the original copy made by the first user. Thus, the second user is unable to share in the first user's ideas manifested as file modifications. Moreover, the second user is prevented from modifying the content of the original file and, thus, is prevented from sharing his or her ideas manifested as file modifications. In short, the first and second users are unable to collaboratively edit the file.

Collaboration, as the term is used herein, implies an ability for multiple clients to share ideas. This sharing includes the ability to automatically express one's ideas to the other members without having to have the other members explicitly solicit the ideas. Collaboration also includes the ability for each member to automatically receive any ideas from members who are transmitting ideas. Thus, at a minimum, collaboration implies communication among members that are party to the collaborative effort. This communication/collaboration may follow many models. A "brain-storming" session is an unrestrained model of collaboration. On the other hand, a "round-robin" model, in which each member has a specified turn to express ideas, is a constrained model of collaboration.

In one collaboration system disclosed in U.S. Pat. No. 5,781,732, data change requests are generated in response to user interactions and are sent to a transponder unit which is connected to all collaborators. The transponder broadcasts the data change requests to all users participating in a collaboration. Each user has a local copy of the collaborative data and a mechanism that receives the data change requests and makes the requested changes to the local data copy. Since all data change requests must pass through the transponder, all data change requests are received by each collaborator in the same order and, thus, data consistency is maintained.

Collaboration may occur locally among users operating with one computer or server or may occur over a network wherein each of the users is located at a computer connected to the network. The Internet is one such network that has established a dynamic, public environment for communication and interaction among its millions of users. In business, the Internet, and particularly the World Wide Web application operating on the Internet, has redefined vendor-manufacturer, manufacturer-distributor, distributor-customer, and other relationships. With extension of the Internet technology into internal, secured networks of individual companies, the "intranet" or "private Internet", as it is called, has enabled new forms of document and information sharing between individual employees and work groups using company directory and network infrastructure.

The World Wide Web (The "Web") has, at its core, a server-client architecture, in which individual clients (i.e., Web-content users) interface via browsers with servers (i.e., Internet-content providers) over a public network to obtain documents from Web sites. Browsers are software programs that enable personal computers to request, receive (e.g., download), interpret, and present Internet documents, and generally navigate the Internet. Web sites are collections of documents, usually consisting of a home page and related, linked documents, located on servers remote from the client. The documents can be compound documents, containing data, graphics, video, sound, and/or other types of media, as well as links to other documents.

Underlying the Web and other Internet technologies are advances in standardization, including personal computer hardware, software, network protocols, and infrastructural conventions (such as the "Uniform Resource Locator" or "URL"). URLs provide location addresses for all document objects on the WWW. A URL uniquely references a document object and often defines an access algorithm using Internet protocols.

To take advantage of the Internet tools and resources have been developed in compliance with the Internet protocols, including applications such as e-mail. E-mail is electronic mail, by means of which documents are sent and received electronically at selected addresses. It has been estimated that a vast majority of Internet-based interaction is with e-mail and other browser-based media that follow a "document send and receive" model. Perhaps due to that model, users often view the Internet as inherently "peer-to-peer", with individuals accessing documents provided by other individuals, without intervention by a higher authority.

Consequently, new collaboration models have been developed which operate in a more "peer-to-peer" fashion. These latter models are built upon direct connections between users in shared private spaces, called "telespaces". Each user has a program called an "activity", which is operable in his or her personal computer system, communication appliance or other network-capable device. The activity program responds to user interactions by generating data change requests, called "deltas." The activity also has a data-change engine that maintains a local data copy and performs the changes to the data requested by the deltas. The deltas are distributed from one user to another by a dynamics manager. The latter type of collaboration system is described in detail in U.S. patent application Ser. No. 09/357,007 entitled METHOD AND APPARATUS FOR ACTIVITY-BASED COLLABORATION BY A COMPUTER SYSTEM EQUIPPED WITH A COMMUNICATIONS MANAGER, filed Jul. 19, 1999 by Raymond E. Ozzie, Kenneth G. Moore, Robert H. Myhill and Brian M. Lambert; U.S. patent application Ser. No. 09/356,930 entitled METHOD AND APPARATUS FOR ACTIVITY-BASED COLLABORATION BY A COMPUTER SYSTEM EQUIPPED WITH A DYNAMICS MANAGER, filed Jul. 19, 1999 by Raymond E. Ozzie and Jack E. Ozzie and U.S. patent application Ser. No. 09/356,148 entitled METHOD AND APPARATUS FOR PRIORITIZING DATA CHANGE REQUESTS AND MAINTAINING DATA CONSISTENCY IN A DISTRIBUTED COMPUTER SYSTEM EQUIPPED FOR ACTIVITY-BASED COLLABORATION, filed Jul. 19, 1999 by Raymond E. Ozzie and Jack E. Ozzie.

The Internet is dynamic and flexible in providing users with entertaining and useful ways of communicating, but it does not meet all the needs of users. For example, the Internet would seem to be ideally suited for collaboration because it has the ability to connect widespread users with diverse hardware and software. However, the security of the Internet leaves much to be desired. While messages can be sent to various numbers of users over the Internet, those messages are typically funneled to third-party Web sites where communications can be intercepted and confidences violated. Consequently, while users interact increasingly through the Internet, they continue to interact off of the Internet in more conventional, secure ways, such as through multi-medium (phone, fax, whiteboard), multi-temporal (real-time, overnight mail) and other informal means of communication.

It would be desirable to extend the Internet to secure collaborative communications and other shared and mutual activities between individuals and small groups in shared private spaces. Such interactions should preferably occur instantly, directly, and confidentially between participants' personal computers, or other network capable devices. It would also be desirable to provide a technique that allows users at various remote sites to securely communicate without requiring extensive involvement of the users in the establishing a secure communication link and maintaining the security system. It is also desirable to reduce the "overhead" involved in providing secure transactions to a minimum in order to increase throughput and speed of operation.

SUMMARY OF THE INVENTION

In accordance with one illustrative embodiment of the invention, different levels of security are prodded so that users can decide the security level of their own communications. Users can choose a low level of security and maintain the security overhead as low as possible. Alternatively, they can choose higher levels of security with attendant increases in security overhead. The different levels of security are created by the use of one or more of two types of keys: an encryption key is used to encrypt clear text data in a delta and a message authentication key is used to authenticate data and insure integrity of the data. Two types of keys are used to avoid re-encrypting the data for each member of the telespace.

In a preferred embodiment, the same physical key is used for the encryption key and the message authentication key in order to reduce key management overhead.

In one embodiment, the security level is determined when a telespace is created and remains fixed throughout the life of the telespace. For a telespace, the security level may range from no security at all to security between the members of the telespace and outsiders to security between pairs of members of the telespace.

In another embodiment, subgroups called "tribes" can be formed within a telespace and each tribe adopts the security level of the telespace in which it resides.

In a further embodiment, members of a telespace which has a medium or high level of security can communicate in confidential communications called "whispers" which are confidential even to other members of the telespace.

BRIEF DESCRIPTION OF THE DRAWINGS

The above and further advantages of the invention may be better understood by referring to the following description in conjunction with the accompanying drawings in which:

FIG. 11 is a schematic diagram illustrating the contents of an invitation message sent by the chair to an invitee.

FIG. 12 is a schematic diagram illustrating the contents of an acceptance message sent by an invitee to the chair.

FIG. 13 is a schematic diagram illustrating the contents of a new member added delta sent by the chair man to all existing members of a group informing them that a new member has been added.

DETAILED DESCRIPTION

Figure 1:
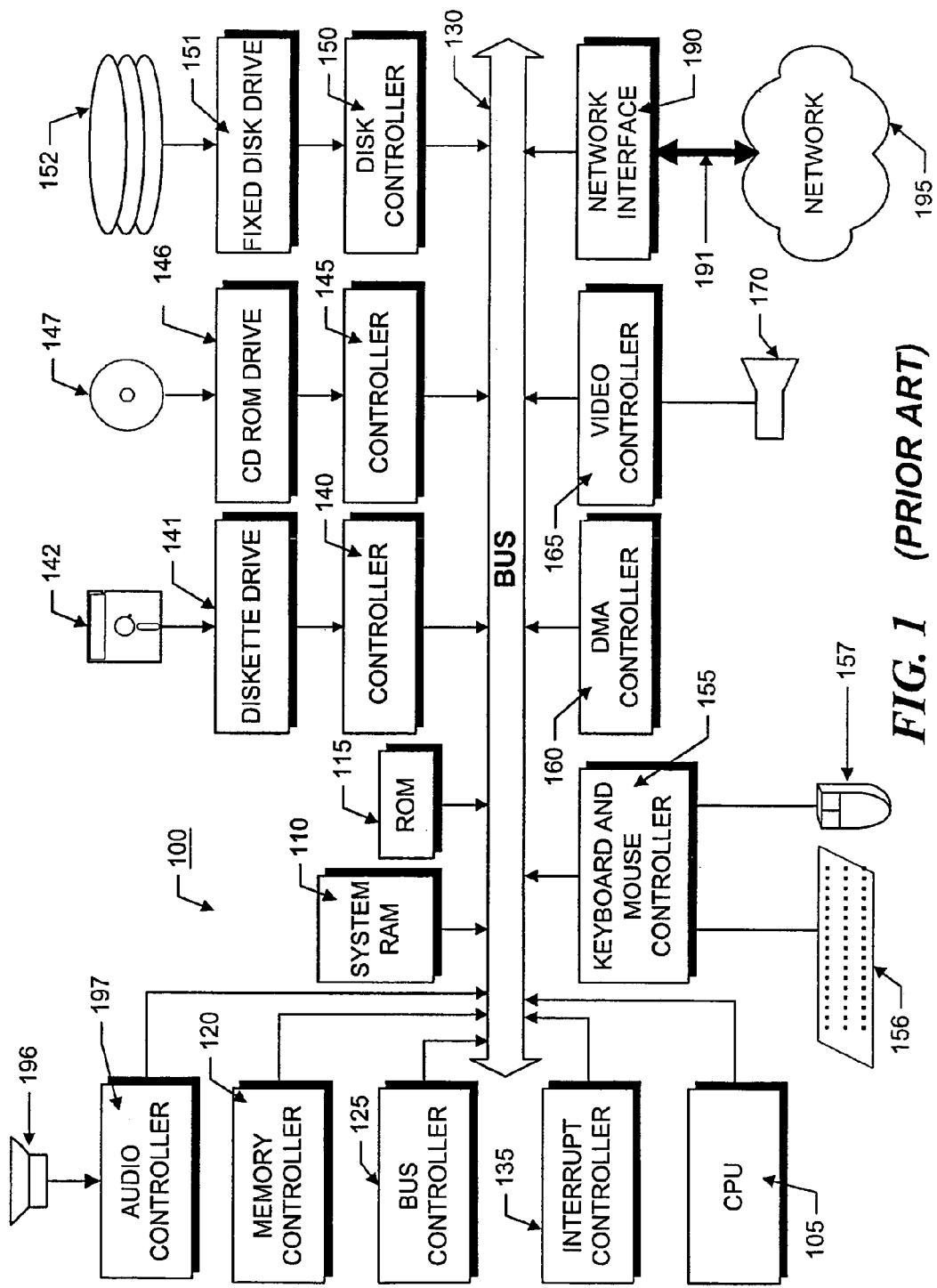
FIG. 1 is a block diagram of an illustrative architecture of a conventional computer system.

FIG. 1 illustrates a conventional system architecture for an exemplary computer system 100, with which the disclosed invention can be implemented. The exemplary computer system of FIG. 1 is discussed only for descriptive purposes, however, and should not be considered a limitation of the invention. Although the description below may refer to terms commonly used in describing particular computer systems, the described concepts apply equally to other computer systems, including systems having architectures that are dissimilar to that shown in FIG. 1.

The computer system 100 includes a central processing unit (CPU) 105, which may include a conventional microprocessor, random access memory (RAM) 110 for temporary storage of information, and read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components.

Mass storage may be provided by diskette 142, CD-ROM 147, or hard disk 152.

Data and software may be exchanged with client computer 100 via removable media, such as diskette 142 and CD-ROM 147. Diskette 142 is insertable into diskette drive 141, which is connected to bus 130 by controller 140. Similarly, CD-ROM 147 is insertable into CD-ROM drive 146, which is connected to bus 130 by controller 145. Finally, the hard disk 152 is part of a fixed disk drive 151, which is connected to bus 130 by controller 150.

User input to the computer system 100 may be provided by a number of devices.

For example, a keyboard 156 and a mouse 157 may be connected to bus 130 by keyboard and mouse controller 155. An audio transducer 196, which may act as both a microphone and a speaker, is connected to bus 130 by audio controller 197. It should be obvious to those reasonably skilled in the art that other input devices, such as a pen and/or tablet and a microphone for voice input, may be connected to client computer 100 through bus 130 and an appropriate controller. DMA controller 160 is provided for performing direct memory access to system RAM 110. A visual display is generated by a video controller 165, which controls video display 170.

Computer system 100 also includes a network adapter 190 that allows the client computer 100 to be interconnected to a network 195 via a bus 191. The network 195, which may be a local area network (LAN), a wide area network (WAN), or the Internet, may utilize general-purpose communication lines that interconnect multiple network devices.

Computer system 100 generally is controlled and coordinated by operating system software. Among other computer system control functions, the operating system controls allocation of system resources and performs tasks such as process scheduling, memory management, networking and 1/0 services.

Figure 2:
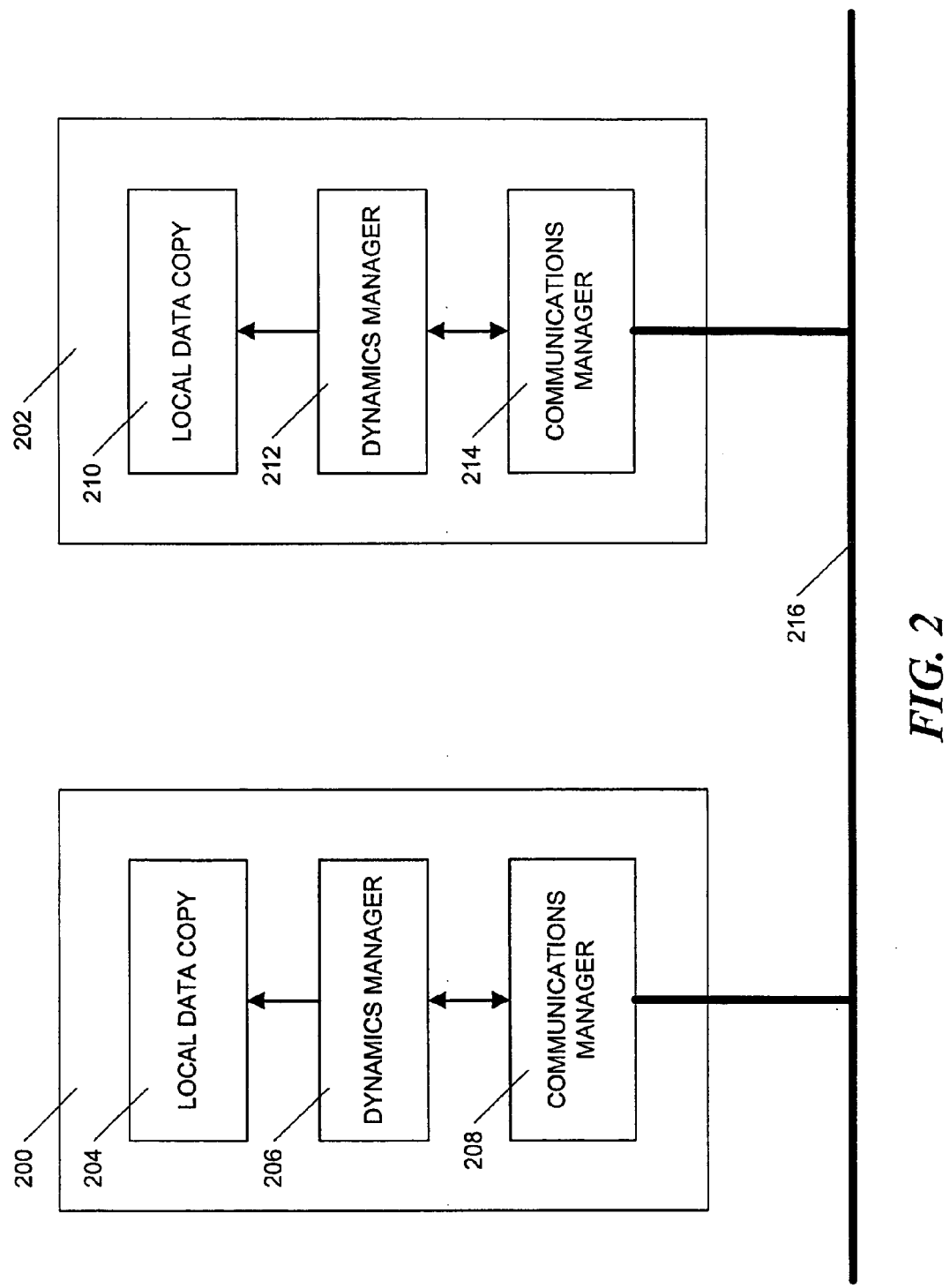
FIG. 2 is a block schematic diagram of an illustrative collaboration system in which local data copies are updated by means of deltas.

FIG. 2 illustrates, in a block schematic form, a configuration of an illustrative collaborative system. FIG. 2 shows two collaborative workstations 200 and 202 connected to a network 216. Each of workstations 200 and 202 could be a computer system such as that shown in FIG. 1 and network 216 could be a private computer network, such as a LAN or WAN, or a public computer network, such as the Internet. Alternatively, stations 200 and 202 could be located on the same computer (not shown), in which case, communications between the two terminals would be local to that computer.

In a preferred embodiment, each of terminals 200 and 202 maintains a local copy, 204 and 210, respectively, of the data on which collaborative work is performed.

Each local data copy, for example data copy 204, is managed by a corresponding software program called a "dynamics manager" 206. Likewise, data copy 210 is managed by its corresponding dynamics manager 212. Although a particular collaboration apparatus is discussed for purposes of illustration, it would be apparent to those skilled in the art that other collaboration apparatus can also be used without departing in spirit and scope from the principles of the invention.

Dynamics manager 206 changes and updates its local data copy 204 in response to the reception of self-contained data units that contain one or more data change requests called "deltas". The data change requests are notifications or prompts to the dynamics manager and other components (not shown) regarding desired changes to the data. Deltas are created by a dynamics manager, such as manager 206, in response to user interaction and are used to update both the corresponding local data copy 204 and, via the network, local data copies in other computers belonging to collaborators who are participating in the same collaborative session.

A delta has a specific format including a header portion for providing control information and a payload portion for providing information regarding the data to which the request pertains. An individual delta can have one or more payloads. Where multiple payloads are employed, each can be targeted to particular collaboration members with unique device capabilities or user roles as will be discussed in detail below.

When deltas generated by dynamics manager 206 are to be sent to other collaborators, the dynamics manager 206 interacts with a communication manager 208. Similarly, dynamics manager 212 interacts with communications manager 214. Communications manager 208 is a mechanism that directs inbound and outbound deltas to appropriate destinations. In a preferred embodiment, the communications manager can be implemented as a computer executable program which directs deltas initiated by communications manager 206 for a transmission over the network 216 to another remote personal computer or another form of network capable device and which directs remotely generated deltas received over the network 216 to dynamics manager 206.

In general, the communication managers 208 and 214 are arranged so that all deltas generated by the dynamics managers 206 and 212 are received by all users participating in the collaboration. Each delta includes an internal sequence number so that the dynamics manager of each collaborator can determine when all deltas have been received. Since the deltas from different collaborators may be transmitted over a number of different paths to each collaborator, the deltas may not arrive in the same order in which they were generated. However, all deltas will be received by each collaborator and the internal sequence number can be used to apply the deltas in the correct order. Therefore, the local data copy maintained by each collaborator, when updated by all deltas will match the local data copies maintained by the other members of the collaboration.

It is desirable to maintain confidentiality among collaborators who join a particular collaboration. This is particularly true when deltas are sent over a public network, such as the Internet. There are three basic concepts that are important to security of information. The first is authentication, which insures that a data recipient knows, and can trust, the identity of the data source. The second concept is integrity, which insures that the data was not changed during transit. Integrity effectively insures that the data is not writable by parties other than the data source and came from a known source. Data integrity prevents attack by third parties by generating or "spoofing" unauthorized data.

The last security concept is confidentiality, which insures that data in transit is not readable by third parties other than the data source and data recipients. Confidentiality prevents attack by third parties by reading or "eavesdropping" on the data.

Figure 3:
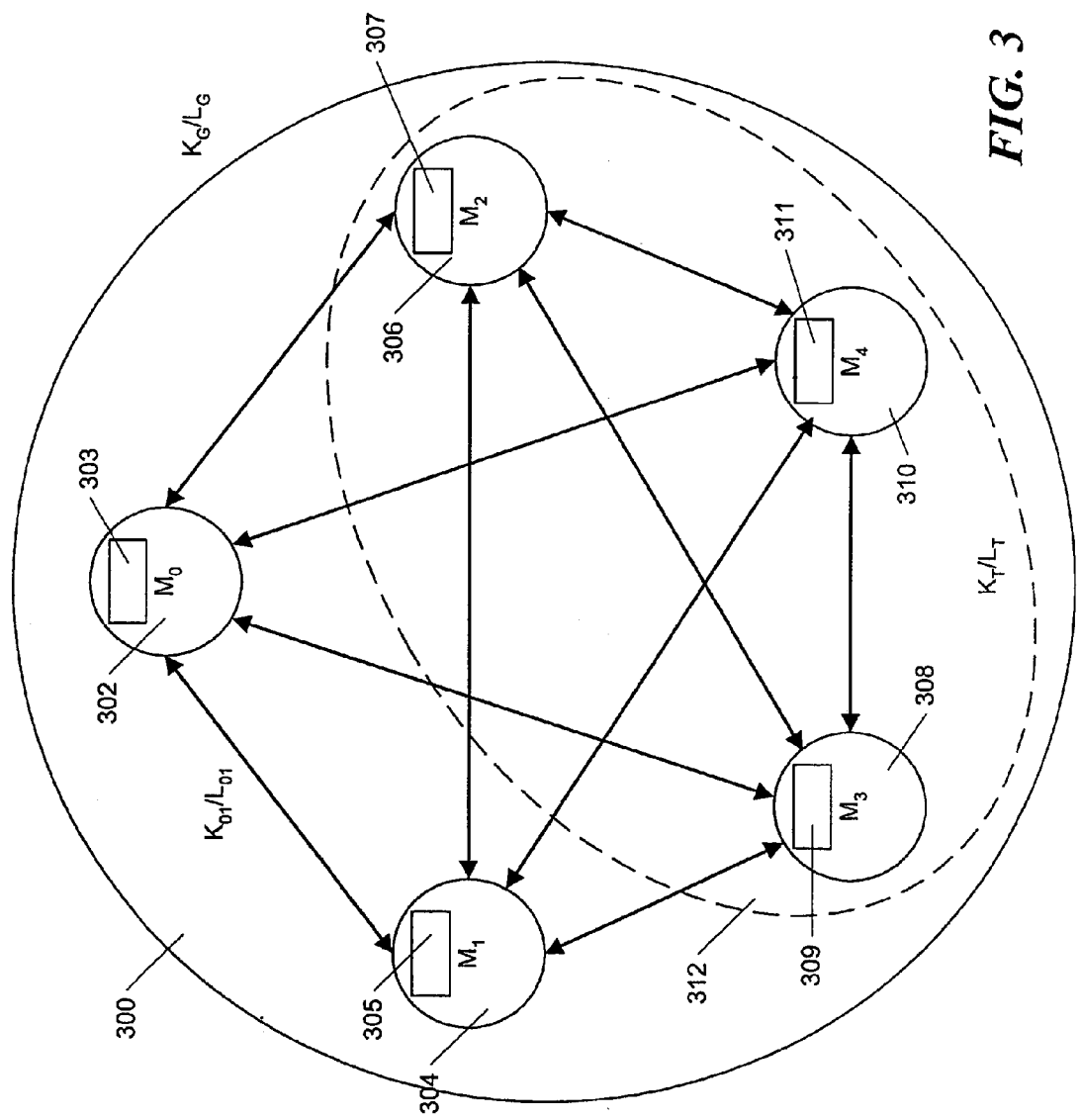
FIG. 3 is a block schematic diagram illustrating a group, a tribe and the encryption and authentication keys used to protect them.

As previously mentioned, security is based on a virtual space where the collaborators participate in one or more activities and share items and where the results of activities are persistently stored on a user's personal computer or other forms of network-capable device. The virtual space is referred to as a "telespace" or "group" and is kept in synchronism in each user's device. In accordance with the illustrative security model, the security of a telespace is what most users will experience as "overall" security after a telespace has been formed, its members admitted and membership is stable. This is referred to as the steady-state delta protocol and concerns the authentication, integrity and confidentiality of information contained in deltas passed between group members. FIG. 3 is a schematic diagram of an illustrative telespace or group 300 with five members: Mo, M1, M2, M3, M4 (302–310). Within each telespace 300, one or more tribes or sub-groups may exist. In FIG. 3, a tribe 312 of three members, M2, M3, M4 (306, 308 and 310) is illustrated.

Each member 302–310 has within it a "protocol engine" (engines 303–311, respectively) which is an application program that sends security messages to the other members and manipulates security information.

Information in telespaces 300 and tribes 312 is protected by one or more keys: an encryption key designated as K and a message authentication/integrity code (MAC) key, designated as L. The K and L keys are conventional keys for a symmetric cipher and have telespace scope. The inventive system can use both block ciphers and stream ciphers, but no states are maintained between messages. Thus, communicating endpoints are not required to maintain security cipher stream state from one message to the next. In this manner, resynchronization is not necessary if there is a temporary communication interruption:

Block ciphers are used in counter mode with an initialization vector that is always randomly generated anew wherever it is used. The initialization vector has a length equal to the block length of the cipher and is used to thwart a stereotypical header attack in a conventional manner. Stream ciphers are used in block mode by combining an initialization vector with the key, such as by an exclusive-OR operation, and then reinitializing the keystream for every message. In this case, the initialization vector has length equal to the key length. Initialization vectors, in general, are not confidentiality protected or authenticity/integrity protected.

It is further assumed that all keys have of some sort of obsolescence mechanism associated with them, such as a timeout, or a fixed number of message or bytes protected. This mechanism is a matter of local policy determined by the telespace and need not be transmitted in any of the protocols described below.

Group keys, designated as KAY, are encryption/MAC keys (respectively) which are shared by all members of the group 300. These keys are used to protect the confidentiality/integrity (respectively) of information contained in deltas from attack by third (non-group) parties. Similarly, tribe keys designated as KT/LT. are encryption/MAC keys that are shared by all members of tribe 312. These keys are used to protect the confidentiality/integrity (respectively) of deltas from attack by non-tribe group members and third parties.

In addition, pairwise keys designated as Kos/Logy are encryption/MAC keys (respectively) that are shared by members Mo and M1, and not by any other group members and are bidirectional keys used to protect communications in both directions between MO and Mi. These keys are used to protect the confidentiality/integrity (respectively) of deltas from attack by group members M2, M3 and M4. Similar pairwise keys, $K_ij/L_ij$, can be used to protect information exchanged between other combinations of members, M; and Mj, from attack by other group members.

Within a telespace, steady state security falls into one of five levels, one of which can be chosen by the creator of the telespace 300 at the time that the telespace is created. The five levels include low-level security that does not require the use of any keys. This level provides no cryptographic security at all. The next level is MediumLevel security that uses a single key pair (KG/Lc) for all members of the group. Within this level authenticity/integrity can be provided by using only the MAC key LG of the KG/Lc pair to protect deltas. Similarly, authenticity/integrity and confidentiality can be provided by using both the KG and Lc keys to protect deltas.

The next level is High-Level Security, which uses a-combination of the group keys KG/Lc and the pairwise keys Kii/L;j. If only authenticity/integrity is required, then only the pairwise MAC keys (L;j) are used to protect deltas; the group key (KG) is not used. Alternatively, if authenticity/integrity/confidentiality are required, then both the group encryption key, KG, and the pairwise MAC keys, L;j are used to protect deltas.

In both the Medium-Level and High-Level Security levels, the pairwise encryption keys (K;j) and MAC keys (L;j) are used for rekeying the group or tribe keys (KG/Lc or KT/LT).

The above levels and modes are applicable to the group (telespace) as a whole and are also applicable for all tribes (subgroups) as well. All the tribes in a telespace have the same "overall security" as the telespace itself, therefore, the levels and modes discussed above for groups can be applied to tribes by replacing the group keys KG/LG by the tribe keys KT/LT wherever they occur above.

Figure 4:
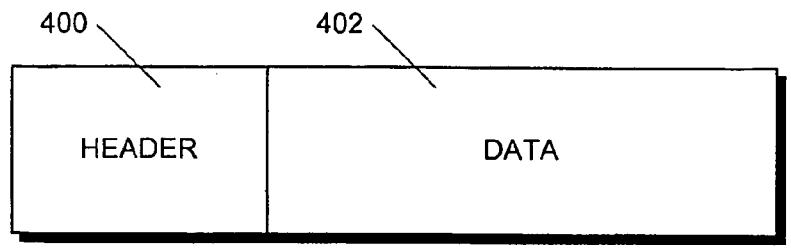
FIG. 4 is a schematic diagram that illustrates the contents of a delta that is sent between members in a group in a low-level security system.

FIG. 4 illustrates the contents of a "delta" which is used to transfer information between group members. Each delta consists of a message header 400, which contains information that is dependent on the specific implementation of the security system. This information may include a protocol version number that, in turn, may include version numbers for both the collaboration system and for the security subsystem. The message header 400 may also include a message flag type or tag ID, which is an identifier that is different for each different type of message. Other information that can be included in the message header can be a structured sequence number. This latter number is a partially ordered sequence number that has telespace scope and, within that scope, logically identifies both the sender of the message and the specific instance of the message itself.

Header 400 can never be confidentiality protected, but, depending on the security level required, it may need to be authenticity/integrity protected just like the application data 402 which comprises the payload or the information which is actually sent between group numbers. The manner in which deltas, such as that shown in FIG. 4, are encoded depends upon the security level desired. For example, in a "low level" security mode that guarantees no security in the cryptographic sense, the delta is sent as shown in FIG. 4, preferably with the header information 400 being transmitted first followed by the payload 402, although the header and payload order is not important for the operation of the invention. In this case, third parties (non-group members) can read or eavesdrop on the delta information 402 and also can write, impersonate or "spoof" deltas.

Figure 5:
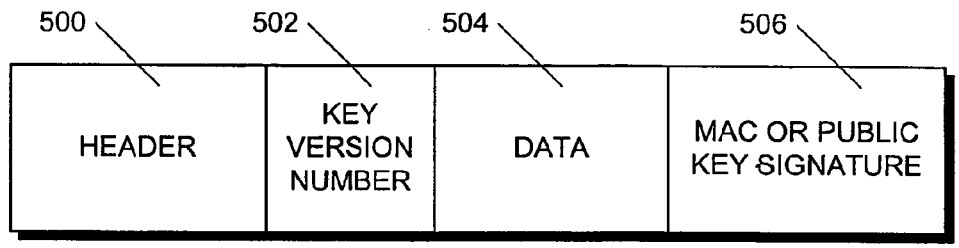
FIG. 5 is a schematic diagram that illustrates the contents of a delta that is sent between members in a group in a medium level security system or high level security system operating in authenticity/integrity mode.

In the case of a "medium level" security system operating in the aforementioned authenticity/integrity mode, the delta information is protected as shown in FIG. 5. In particular, for each delta, the header information 500 is transmitted followed by a key version number 502, the plaintext data 504 and an authenticator 506. Again, the order of these elements is not important. The authenticator can be a MAC code 506 that protects the authenticity/integrity of the data 504 and proves that the message was sent by a group member, because only group members know the group authentication key, 14 LG. In an alternative embodiment, a public key signature authenticator can also be used as a message authenticator. In this case, the message authenticator 506 consists of the public key signature of the hashed, concatenated header and data.

In a preferred embodiment, a key version number has two parts: a telespace wide unique string called a "KeyIdentifier", and an incremental sequence number called a "KeyVersion." The KeyIdentifier is needed to differentiate between keys that may be independently generated by different members of the telespace. Since one member is not aware that another member may also be generating a new key, the KeyIdentifier allows the keys to be uniquely identified. The KeyVersion is needed to differentiate between old, current, and new keys. At a steady state, members would be using a set of keys that have different values for the KeyIdentifier but that have the same KeyVersion value. The members would be able to delete "old" keys with lesser KeyVersion values than the current KeyVersion value.

In a preferred implementation, MAC code 506 is constructed by first hashing the header 500 concatenated with the data 504 and then protecting the hashed result in accordance with a conventional message authentication algorithm. The intermediate hash function is used in order to construct a MAC code in a manner that is parallel to the high security version discussed below. It is also possible to implement this mode without using the intermediate hash function by simply protecting the header and data in the group authentication key LG using again a conventional MAC algorithm. As previously mentioned, the medium level security system operating in the authenticity/integrity mode produces a security system in which third parties can read or eavesdrop but only group members can write, impersonate or spoof deltas of other group members.

Figure 6:
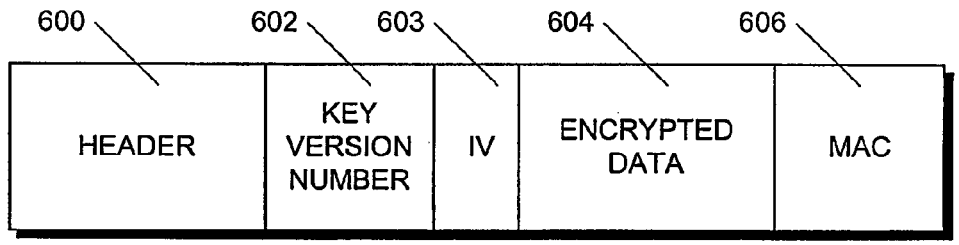
FIG. 6 is a schematic diagram that illustrates the contents of a delta that is sent between members in a group in a medium level security system or a high level security system operating in authenticity/integrity/confidentiality mode.

A medium-level security system operating in the authenticity/integrity/confidentiality mode protects the delta data as indicated in FIG. 6. In particular, 6 delta is transmitted by sending the header with the key version number 602 and an initialization vector 603, the data 604 and the message authentication code 606. However, in this case, the data 604 has been encrypted. This protocol protects the confidentiality of the delta data by encrypting it in the group encryption key KG and continues to protect the integrity and authenticity with the group authenticator 606. The data 604 is encrypted with the group encryption key KG by means of conventional encryption algorithms and the encrypted data is concatenated with an initialization vector. The authentication or MAC code is again formed in a preferred embodiment by hashing the concatenation of the header and plaintext data and then encoding the hashed information with the group authenticator key LG. It is also possible to implement this mode by encrypting the concatenation of the data plus a hash of the header and data with a single encryption key, KG, and then concatenating the result with the header, key version number and the initialization vector. This latter encryption insures both confidentiality and authenticity/integrity without using a separate MAC portion that splits the responsibilities for confidentiality and authenticity/integrity between two keys KG and LG. The implementation shown in FIG. 6 is actually used to make the implementation parallel to the high security mode discussed below.

Figure 7:
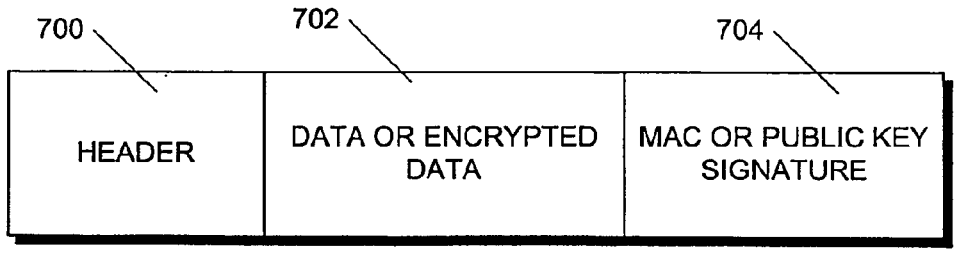
FIG. 7 is a schematic diagram which illustrates the contents of a delta which is sent between members in a group in a high level security system operating in authenticity/integrity mode.

In a "high level" security system operating in the authenticity/integrity mode, delta data can be protected using either the configuration shown in FIG. 5 or the configuration shown in FIG. 7. The protocol used in this system transmits plaintext delta information, but, in order to ensure authenticity/integrity, it uses either a single-targeted, secret key multi-authenticator or a public key signature authenticator.

In the case of single-target secret key multi-authenticator, the configuration illustrated in FIG. 5 is used. In particular, the header information 500 is transmitted with the key version 502, the unencrypted data 504 and the message authenticator 506. However, in this case, the key version number 502 consists of a concatenation of all of the key versions between the sender and all of recipients. Likewise, the message authenticator 506 consists of a concatenation of the individual message authenticators between the sender and each recipient. Each message authenticator is protected with an authentication key that is used only between the sender and the recipient (one of the L;j keys).

Again, in a preferred embodiment, an intermediate hash is used in the message authentication code. In particular, the header and data are concatenated, hashed, and then protected with the appropriate authentication key. In this case, the intermediate hash is used to avoid rehashing the entire header and delta for each of the authentication keys. Once the header and delta have been hashed, this hash can be used multiple times by simply protecting the hashed information in the appropriate authentication key.

In an alternative embodiment, a public key signature authenticator is used as a message authentication code. This configuration is illustrated in FIG. 7. In this arrangement, the header information 700 transmitted first followed by the unencrypted (A/I mode) or encrypted (A/I/C mode) data 702. The message authenticator code 704 consists of the public key signature of the hashed, concatenated header and data.

A high-level security system operating in the authenticity/integrity/confidentiality mode protects data with the delta configurations illustrated in FIG. 6 and FIG. 7. It is essentially the same as the authenticity/integrity mode shown in FIGS. 5 and 7 except that the delta data is encrypted with the group encryption key KG and concatenated with an initialization vector in the case of FIG. 6.

Figure 8:
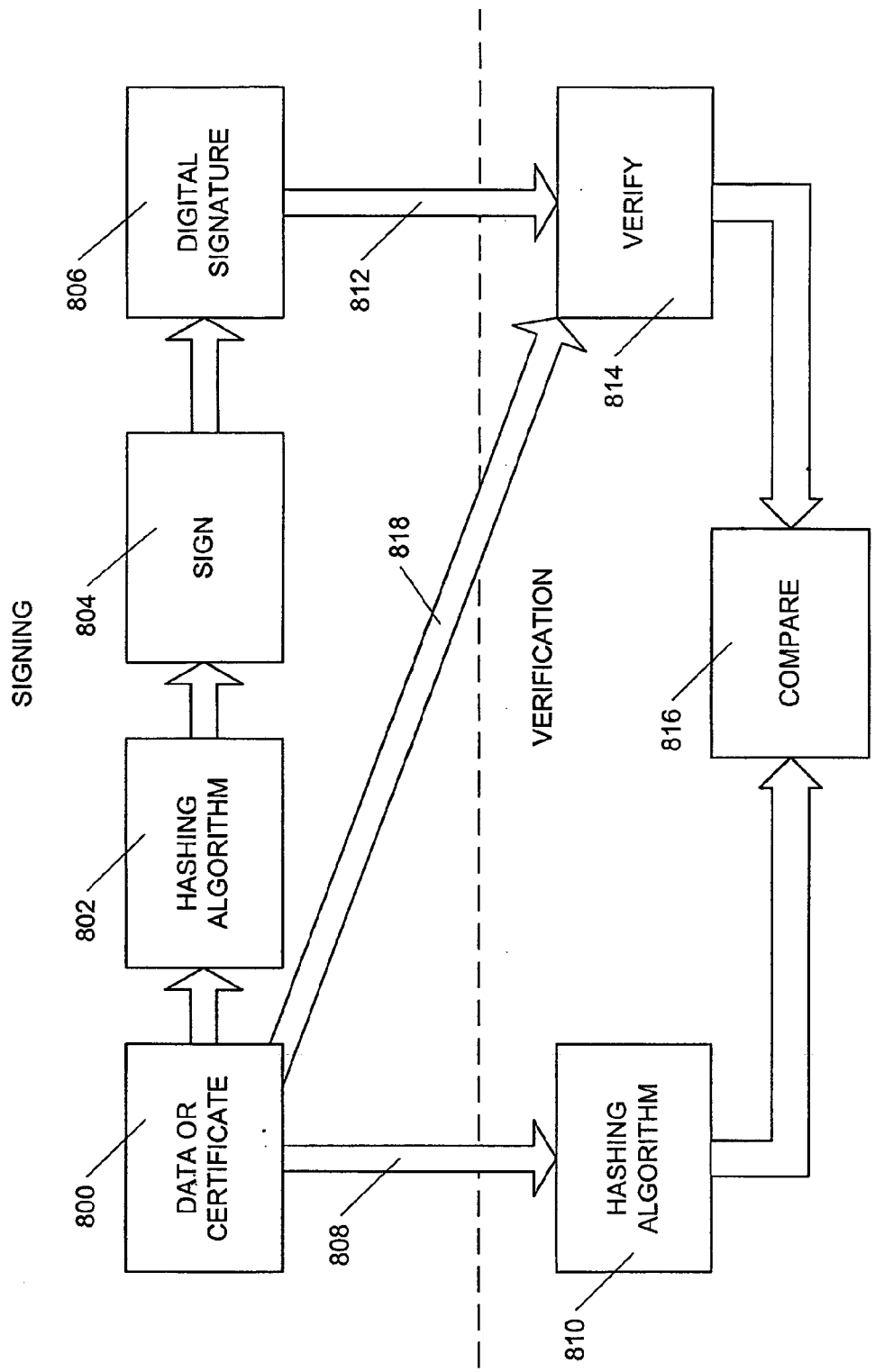
FIG. 8 is a. block schematic diagram illustrating the creation and verification of digital signatures and certificates.

A mechanism for generating and using a digital signature or a digital certificate is illustrated in FIG. 8. In order to generate a digital signature of data 800, a hashed value of the data 800 is computed using one of a number of common well-known hashing algorithms as indicated in step 802. The hashed data is signed (with an encryption like operation), as indicated in step 804, using the private key of a public/private key pair. The result is a digital-signature 806. Moreover, if the data relates to a user's identity or public key, the data (not the signature) is called a digital "certificate."

In order to use the digital signature, a validation procedure is performed as indicated below the dotted line in FIG. 8. In particular, the digital signature is provided as indicated by arrow 812 and a certificate is provided as indicated by arrow 818 to a signature verification algorithm 814 that uses the public key of the public/private key pair to verify (a decryption like operation) the hashed data. The data 800 itself is provided to a hashing algorithm 810 as indicated in arrow 808. This hashing algorithm is the same as the hashing algorithm 802 used to generate the digital signature. The rehash of the data is then compared to the verified hashed data as indicated in box 816. If the results are the same, the verified hashed data is correct, i.e.; the data is authentically associated with the signature.

Figure 9:
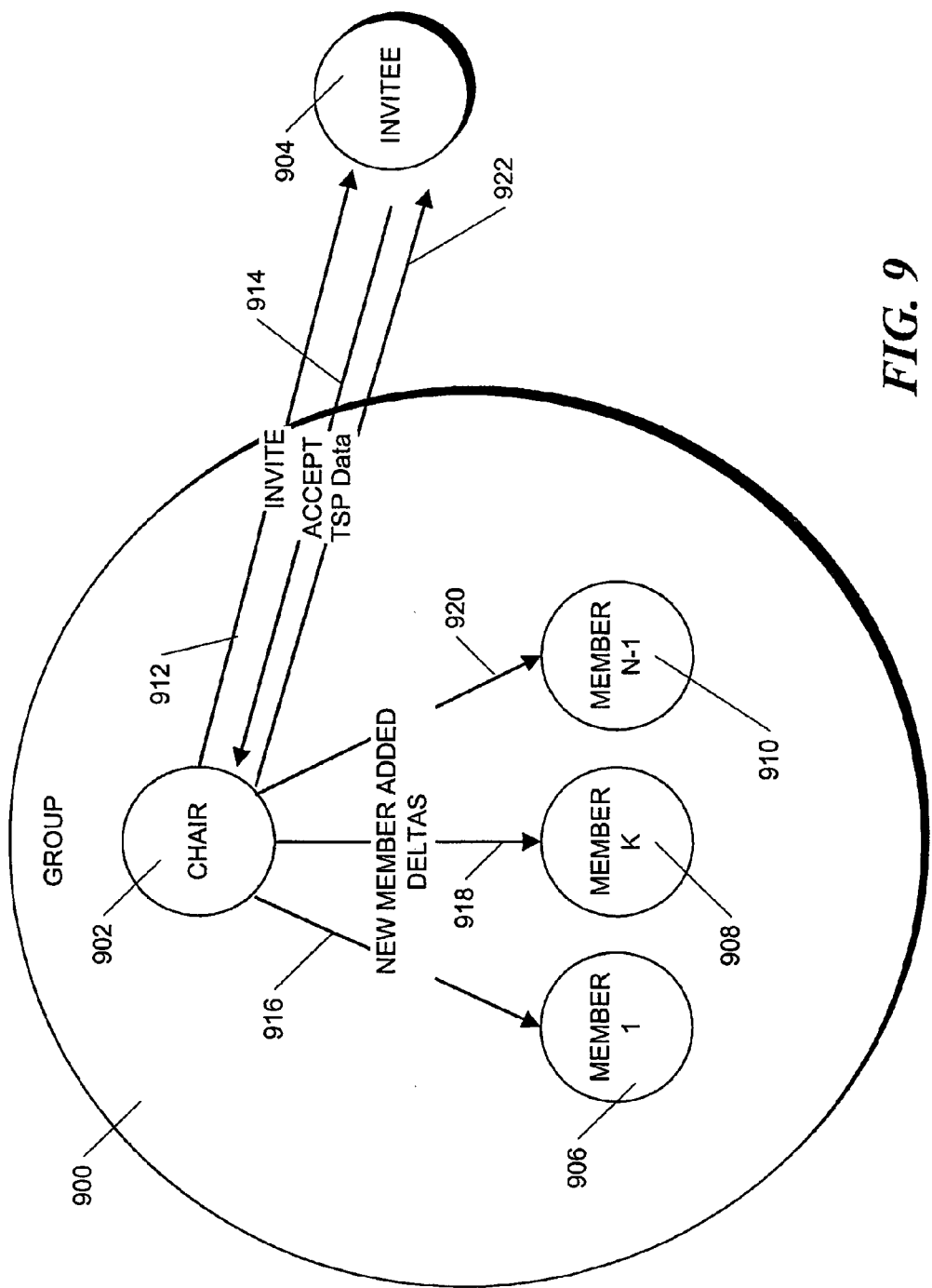
FIG. 9 is a block schematic diagram illustrating the addition of a new member (invitee) to an existing group.
Figure 10:
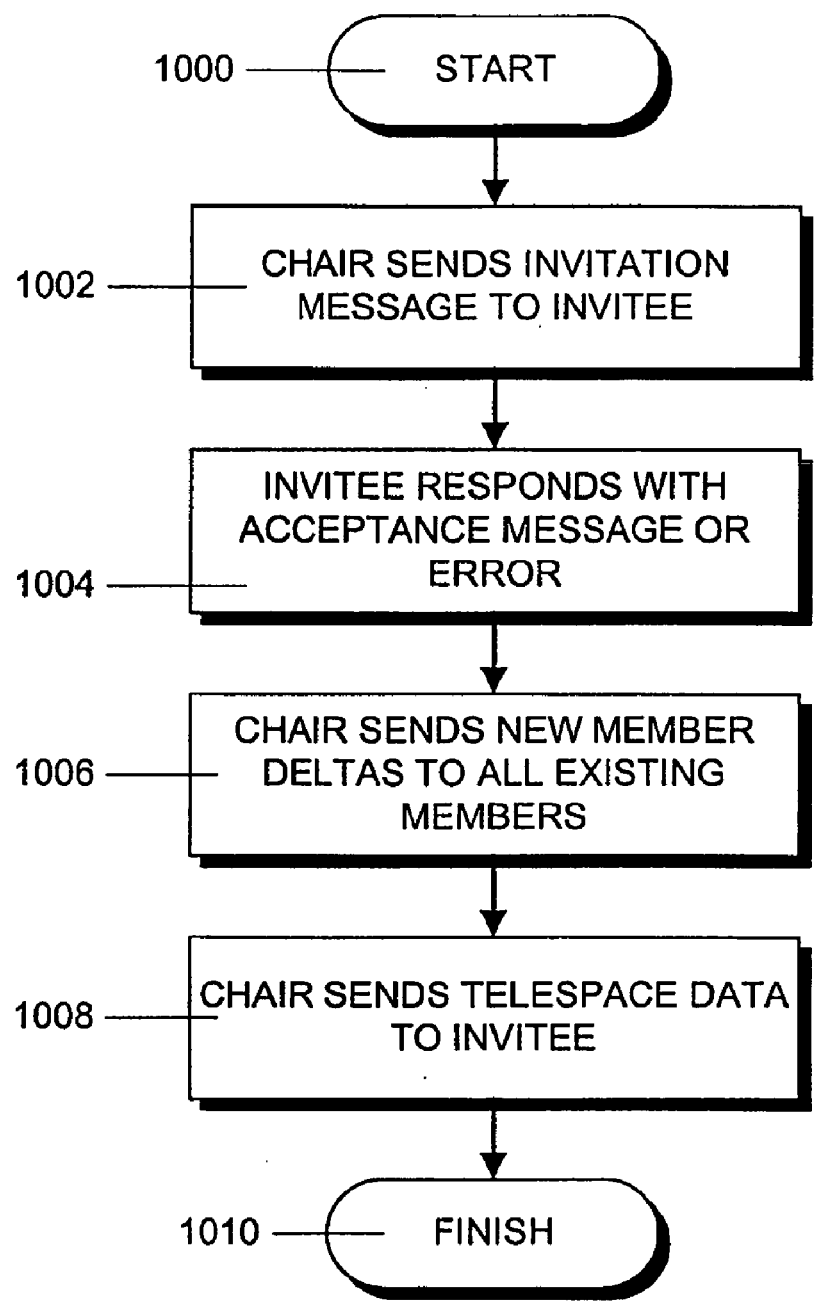
FIG. 10 is a flowchart showing the steps in an illustrative routine that a chair might use to add a new member to an existing group.

The procedure with which a secure group is formed is illustrated schematically in FIG. 9 with the steps illustrated in FIG. 10. As shown in FIG. 9, the group 900 consists of a chair 902 and N–1 other members, three of which are shown as members 906, 908 and 910. Formation of the group 900 is controlled by a chair 902, who is a member endowed with the authority to invite and add a new member. In accordance with the illustrative procedure, an invitee 904 will be added to the group 900 after an initial authentication. The following discussions focus on the highest security mode with authenticity and integrity. The other contemplated modes can be derived from this mode.

The joining procedure begins in step 1000 and proceeds to step 1002. In step 1002, the chair 902 sends an invitation message to the potential invitee 904. This message is schematically illustrated by the arrow 912 in FIG. 9. The contents of this message are illustrated in FIG. 11. The message consists of a header 1100 followed by the invitee name 1102 which can be a URL or other identifying information. The order of the header could also be reversed without departing from the principles of the invention. The invitee name is followed by a signed invitation "nonce" 1104. A signed nonce is signed data which includes a hash of the timestamp generated by the chair, the name/URL of the chair 902, the certificate of the invitee 904 (if available), the name/URL of the telespace; and an invite "OpCode", which is a tag used to distinguish the different contexts in which signed nonces can occur.

Generally speaking, a nonce is a time-varying parameter that is generated by a principal A and sent to a principal B, which is used only once in a given context (e.g., an instance of A inviting B via the invitation protocol specified herein). In fact, the nonce defines the context; namely, it is used to guarantee the timeliness of a protocol run, in order to prevent replay and interleaving attacks. A nonce needn't be secret, only one-time-unique. Typical examples of nonces used in various systems are: random numbers that are collision-free, timestamps (which are nearly ideal for systems having a trustworthy clock, especially in the presence of a trusted distributed time synchronization protocol), and sequence numbers. In a preferred embodiment, timestamps are used.

In the present context what is important is that, for all runs of the protocol, the nonce can never (to within cryptographic certainty) be repeated (within a certain time window, determined by local policy). This could be accomplished, for example, by having a member memorize its outstanding nonces/invitations (along with other info about the protocol run), in non-volatile store, for some period of time (dependent on local policy) according to the local clock, beyond which time the nonce information must be discarded and the protocol run aborted.

The signed nonce 1104 is followed by cryptographic data 1106 that is the security context information used with this message. This information is chosen by the chair and is required so that the recipient can interpret the message properly. It includes, in particular, the string name of the algorithm used to encrypt information with the one-time key, as discussed below. It also includes whatever other information the message recipient needs to process the message, such as key length, number of rounds, the names of any hash algorithms used, names of key generator algorithms, etc.

The cryptographic data 1106 is followed by a the one-time key information 1108 encrypted with the invitee's public key according to some previously agreed upon public-key encryption algorithm. The one time key is a key for a symmetric cipher that is used only once for encrypting the invitation information as discussed below.

The key information is followed by invitation information 1110 encrypted with the one-time key. The invitation information also includes the timestamp generated by the chair that is discussed above and can be concatenated with an initialization vector. The invitation information is application-data including the telespace name/URL that informs the invitee 904 about the kind of activity for which the invitation is issued. It may include, among other things, the cryptographic information that must be used in the telespace as mandated by the chair 902 (e.g., low/medium/high level, A/I/C modes as discussed above). In this manner, the invitee is informed of the security characteristics of the telespace it is being invited to join and can, for example, decide not to join. If the certificate of the invitee is not known, then the encrypted one-time key 1108 is omitted and the timestamp and invitation information 1110 is sent unencrypted.

The invitation information 1110 is followed by the chair's signature on a hash of the header information 1100, invitation nonce 1104, the unencrypted one-time key (if included in the message), the cryptographic data 1106 and the unencrypted invitation information (without the timestamp). This signature binds all of the indicated information to the chair's certificate, which, in turn, is bound to the chair via the invitees local public key certificate validation policy.

The last piece of information 1114 sent is the chair's certificate, containing the name (URL/persona) of the chair, the chair's public signature verification key, and other information such as public-key algorithm identifier(s), public encryption key, etc., all bound together via (one or more) signatures of some "trusted" certificate authorities. The certificate is formatted in some certificate format that is either well known or at least recognizable by the invitee. This format can be a public key-based certificate (wherein the certificate authority is embedded inside a well-known hierarchy of certificate authorities), or a "web-of-trust certificate", for example using PGP or SDSI, or even merely a self-signed certificate constructed on the fly just for this purpose. The degree of "trust" that the invitee places in the certificate depends on the invitee's local public key certificate validation policy.

Figure 15:
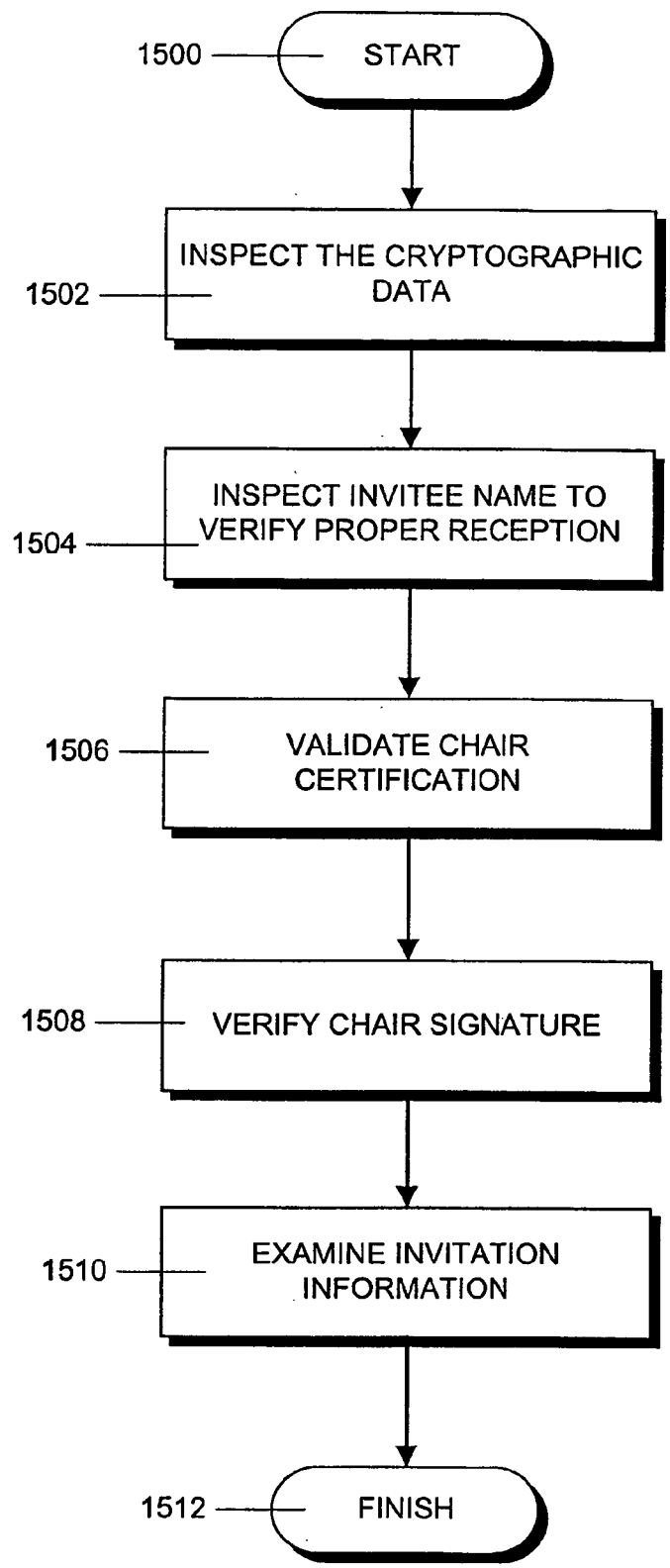
FIG. 15 is a flowchart showing the steps in an illustrative routine that an invitee might use to respond to an invitation.

Upon receipt of this message, the invitee takes the steps outlined in the flowchart illustrated in FIG. 15. The invitee procedure starts in step 1500 and proceeds to step 1502 where the invitee inspects the cryptographic data 1106 to learn the algorithms used in encrypting the message. Then in step 1504, the invitee examines the invitee name to be sure that this invitation is intended for them.

Next, in step 1506, the invitee validates the chair's certification that includes' the chair's name/URL, according to the invitee's local public key validation policy.

The invitee does this by invoking an appropriate certificate validation provider (which may implement the trivial/default "trust-any-self-signed-certificate" validation algorithm, if that is the invitee's local policy).

In step 1508, the invitee verifies the chair's signature to make sure this invitation really came from the chair 902, and that the invitee 904 really was the invited party.

Finally in step 1510, the invitee decrypts and examines the invitation information to decide whether the invitee wants to accept the chair's invitation. The procedure then finishes in step 1512.

Returning to FIG. 10, if the invitee 904 decides to accept the invitation, then, in step 1004, the invitee 904 responds by sending an accept message to the chair 902, which message is schematically illustrated as arrow 914 in FIG. 9. Alternatively, if the invitee decides not to accept the invitation, an error message is sent from the invitee 904 to the chair 902.

The contents of the acceptance message are illustrated in FIG. 12. The message consists of a header 1200 followed by the signed invitation "nonce" 1202 that was sent from the chair to the invitee in the invitation message. This is used so that the chair can recognize that this accept message is in response to the invitation. The signed nonce 1202 is followed by a signed acceptance nonce 1204. The signed acceptance nonce includes a timestamp generated by the invitee, the name/URL of the invitee 904, the certificate of the chair 902, the name/URL of the telespace, and an acceptance OpCode.

The nonce 1204 is followed by the security context cryptographic data 1206 that is similar to the cryptographic data 1106.

Next, the public-key encryption of a newly-generated one-time key 1208 is sent using the public key encryption mechanism, parameters, information and public-key encryption key sent to the invitee 904 by the chair 902 (e.g., a public RSA encryption key).

The encrypted one-time key 1208 is followed by the application-data 1210 including the two timestamps and acceptance data encrypted using the one-time key. This information 1210 informs the chair 902 about the invitee's 904 acceptance.

Next, the Signature of the invitee 904 is sent. This signature is on the hash of the header information 1200, the chair's name and the invitation nonce 1202 concatenated with the acceptance nonce 1204, the unencrypted one-time key, the cryptographic data 1206 and the unencrypted acceptance information (without the timestamp). This signature binds all the indicated information to the invitee's certificate (which, in turn, is bound to the invitee 904 via the chair's certificate public key validation policy). Note that the name of chair 902 must be included within the scope of this signature, to prevent the chair from sending the invitee-signed one time key, known to the chair, to a third party, thereby impersonating the invitee 904.

Finally, the invitee's certificate 1214 is sent.

Figure 16:
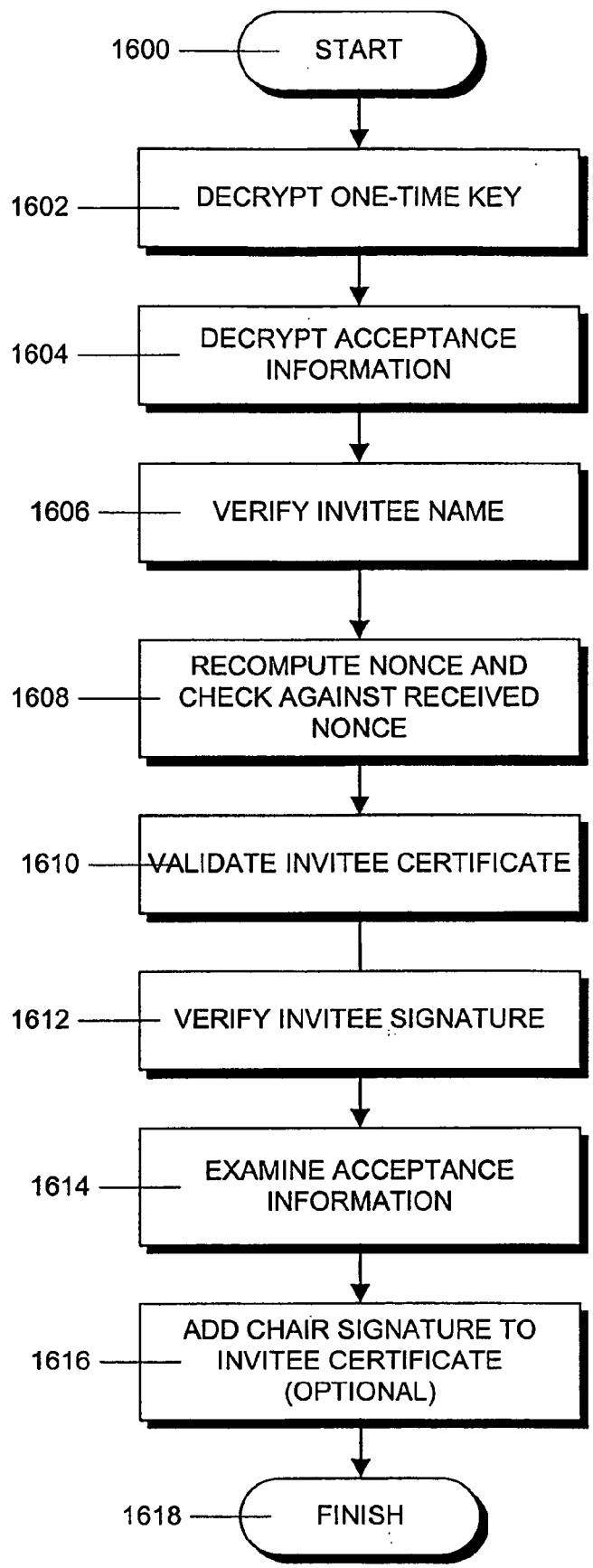
FIG. 16 is a flowchart showing the steps in an illustrative routine that a chair might use to respond to an acceptance message from an invitee.

Upon receipt of this message, the chair 902 performs the procedure illustrated in the flowchart of FIG. 16. This procedure begins in step 1600 and proceeds to step 1602 where the chair 902 decrypts the encrypted one-time key, thereby learning the key.

Next, in step 1604, the chair 902 uses the one-time key to decrypt the encrypted acceptance information. Then in step 1606, the chair examines the invitee's certificate to retrieve the invitee's name.

Figure 23:
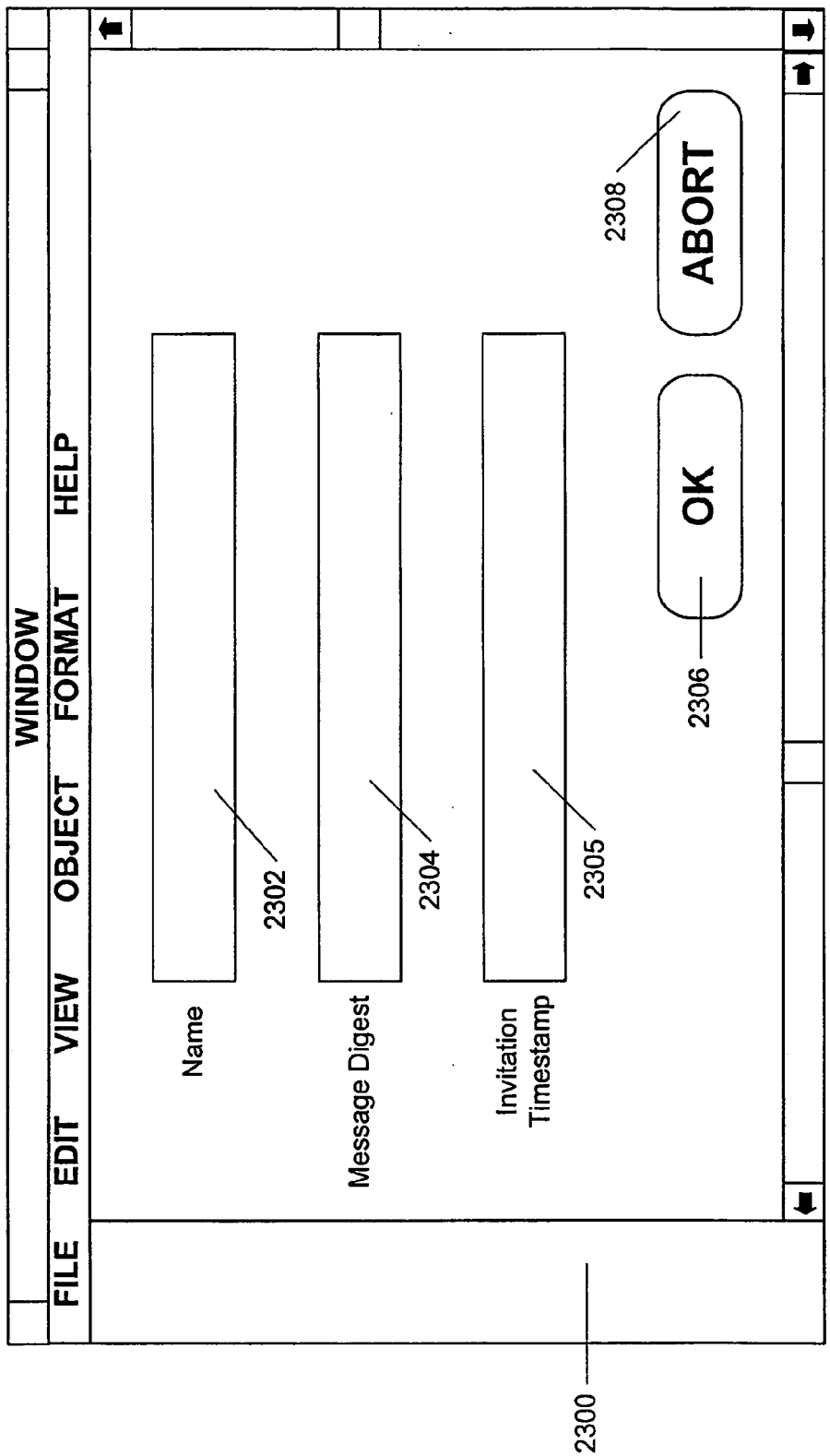
FIG. 23 is a schematic diagram illustrating a screen display of a dialog box that displays information for visual verification and requires a user to accept or reject the information.

In step 1608, the chair 902 recomputes the invitation nonce and checks the recomputed nonce against the received invitation nonce to determine to which invitation the acceptance message is responding. Note that, in accordance with one aspect of the invention, the invitation nonce (1104 in FIG. 11) is "stateless", that is, it can be interpreted regardless of the timing involved. For example, assume a member A issues an invitation to an invitee B from device 1, but later receives B's acceptance at device 2. Even if the nonce in the original invitation message was sent, via a delta, to all devices that A could use, the acceptance message from invitee B might arrive at device 2 before the delta carrying the invitation nonce and so no comparison could be made by software at device 2. In order to avoid this problem, information regarding the nonce is visibly displayed to member A at all of his devices, including device 2. An example of this display is shown in FIG. 23 and the display might be accomplished via, for example, a user interface dialog box 2300 or other similar mechanism. As shown in FIG. 23, three pieces of information are displayed in dialog box 2300: the invitee B's subject-name 2302, the message digest of invitee B's certificate 2304 and a timestamp from the invitation message signed nonce 2305.

A sender's "certificate" is a package that carries two important pieces of info: a "subject-name" of the message-sender, and his/her "public-key". In this case, B's 22 subject-name is extracted by the protocol engine in device 2 and displayed in dialog box 2300 in text box 2302. An example of this name might be "wtuvell(d)-groove.net." A can then verify that the acceptance message corresponds to the invitation.

Since A already knows the subject-name of the invitee B, in order to validate the acceptance, A must receive the message-digest-of-the-certificate via a route other than the inventive collaboration system. For example, a typical way to receive this information is for A to call B on a telephone and ask what the message-digest-of certificate is supposed to be. For example, this computed message digest might be something like "0a, 1 b,2c,3d; 4e,5f,6a,7b; 8c,9d,ae,cf; c1,d2,e3,f4; 05,16,27,38; 49,5a,6b,7c".

Figure 21:
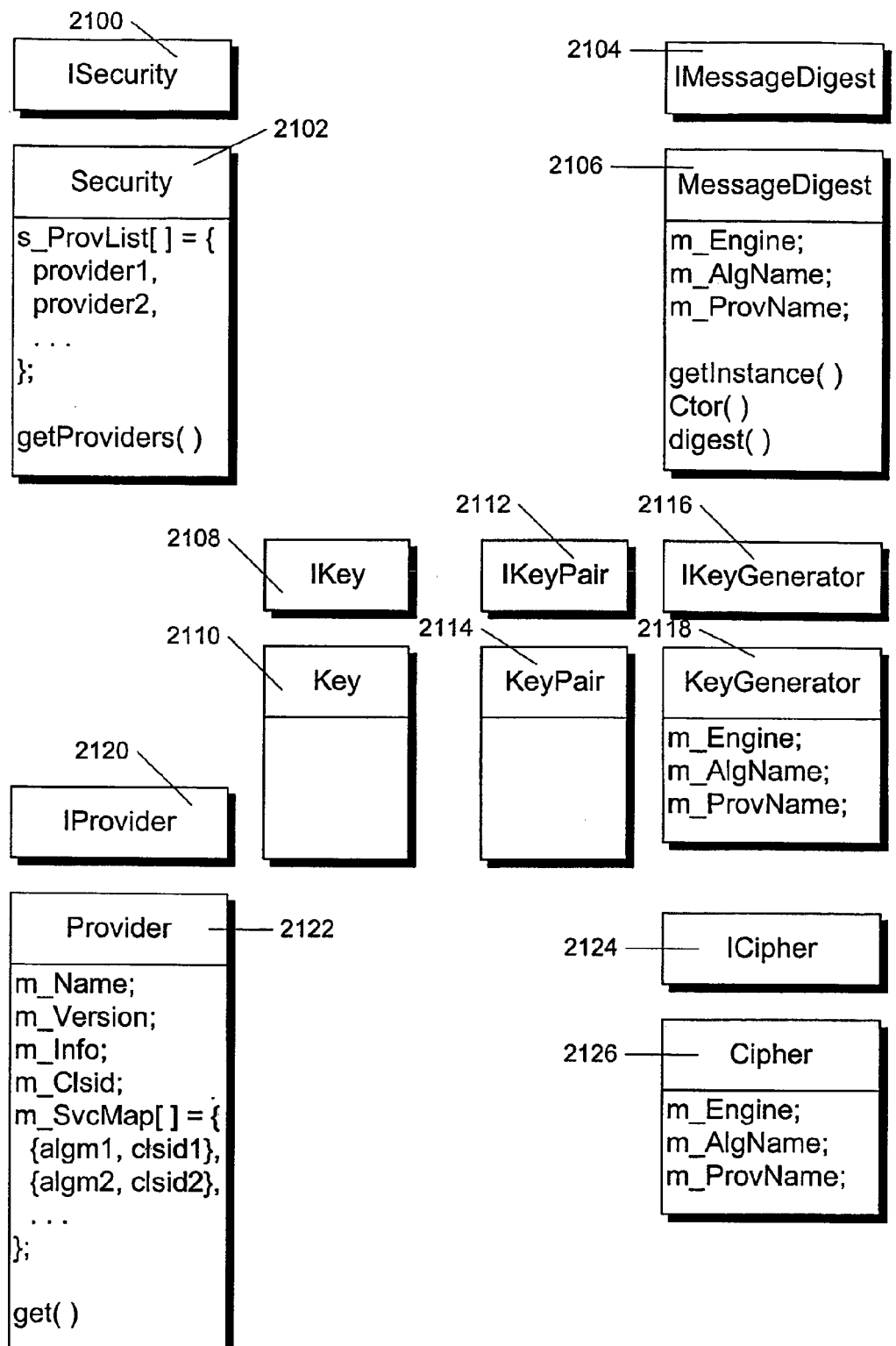
FIG. 21 is a block schematic diagram illustrating sample abstract classes in an object-oriented implementation of the inventive security system.
Figure 22:
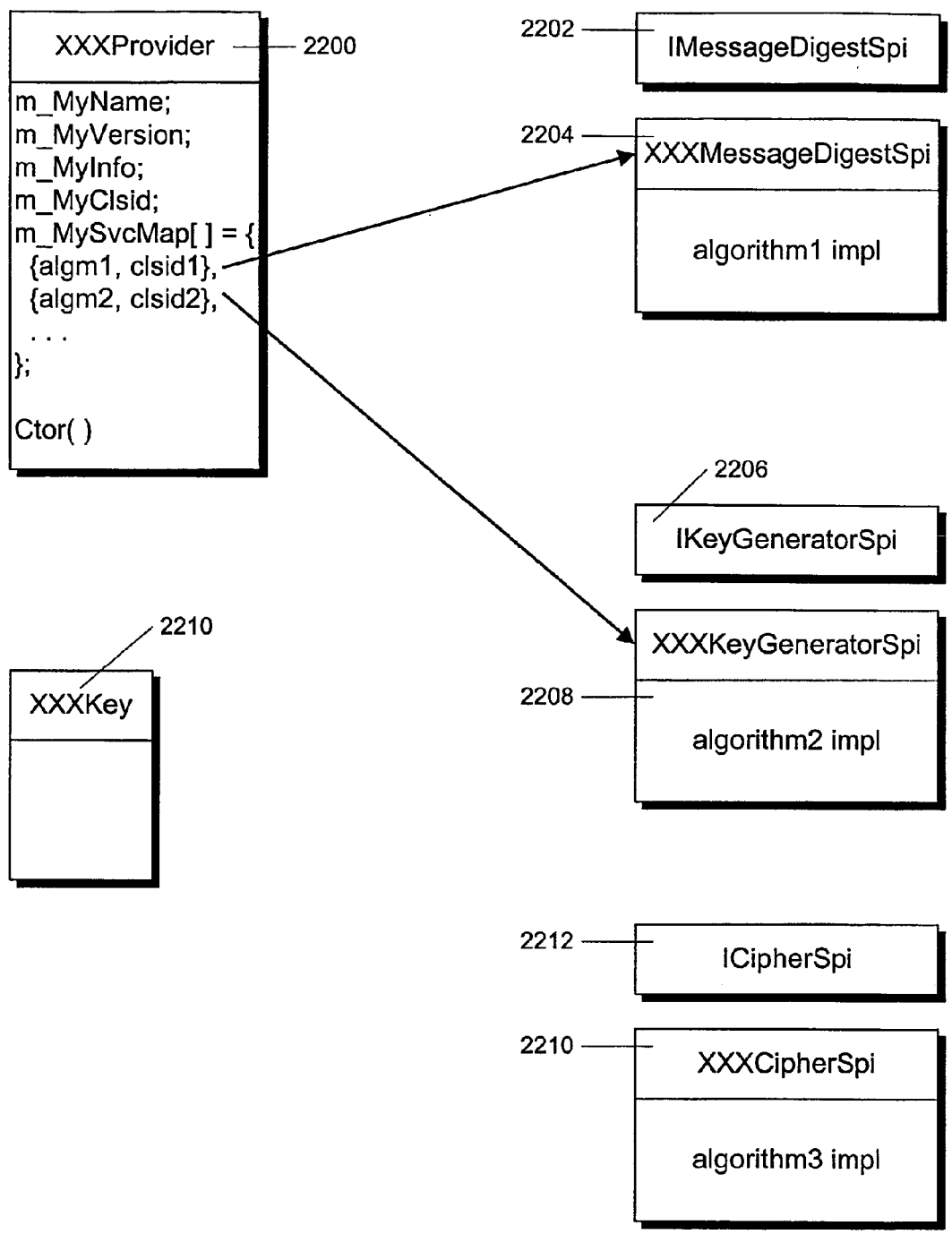
FIG. 22 block schematic diagram illustrating sample concrete classes in an object-oriented implementation of the inventive security system.

When A receives B's certificate via the acceptance message, the message digest (or certificate "fingerprint") can be algorithmically computed from B's certificate 1214 in the acceptance message by the security services architecture illustrated in FIGS. 21 and 22 using a conventional message-digest algorithm (such as MD5 or SHAD. This recalculated message digest is displayed in box 2304. If the recalculated message digest matches the known correct message-digest, then A can accept the purported certificate as authentic; otherwise, it is rejected. This operation is called "certificate validation."

The "signed-nonce" is the signature of a message. As such, it binds together the message timestamp with information including the sender's certificate. In order to avoid a "replay attack" (a re-sending of an authentic message than had previously been sent), it is also necessary to verify that the timestamp in the invitation nonce 1202 that is included in the acceptance message is within an acceptable range. The timestamp information is extracted from the nonce and displayed in box 2305 of dialog box 2300.

This information might, for example, "Invitation message to nashtgiri@groove.net at 20000407121124Z". Since A generated the timestamp at some earlier time, presumably A has knowledge of that time. Member A can then interpret the timestamp and decide whether the information is acceptable. If Member A accepts the information, he clicks the OK button 2306, if not the ABORT button 2308 is clicked.

A similar problem arises if the invitee B receives the telespace data at a device different from the device from which the acceptance was sent. This latter problem is handled in the same fashion.

Next, in step 1610, the chair 902 validates the invitee certificate according to the chair's local public key policy. This step can be omitted if the chair already had the invitee's certificate at the time of the invitation message, above, and is still happy with the validation it did at that time. The chair performs this validation by invoking an appropriate certificate validation provider.

Next, in step 1612, the chair 902 verifies the invitee's signature that, in turn, verifies the authenticity/integrity of the acceptance message, to make sure this acceptance really came from the invitee 904.

Then, in step 1614, the chair examines the decrypted acceptance information to make sure it matches the invitation information, and to decide whether or not the chair wants to recognize the invitee's acceptance.

Finally, in step 1616, the chair can optionally add its own signature to the invitee certificate as an additional signature. This additional signature enables a policy whereby group members can validate the invitee's certificate provided they trust the certification of the chair 902.

The procedure then ends in step 1618 and, if the information is authentic, the invitee thereupon becomes a "member of the telespace." Referring back to FIG. 10, the chair 902 then sends "new member added" deltas to all members existing in the group 900 as set forth in step 1006. These new member messages are schematically illustrated as arrows 916, 918 and 920 in FIG. 9.

The contents of the new member added message, which the chair sends to the other pre-existing members, is illustrated in FIG. 13. The delta message comprises a header 1300 followed by aggregated key version information which is the concatenation of all key version numbers for the group key and all pairwise authentication/integrity keys.

The aggregated key version 1302 is followed by aggregated re-key 30 information 1304 that consists of the concatenation of encrypted new group encryption and authentication keys. For each member pair, the concatenated group encryption and authentication keys are encrypted using the pairwise key for the member pair and the result is concatenated with an initialization vector. These concatenated keys are then themselves concatenated to form the aggregated re-key information 1304. The new keys replace the old/current group keys KG/LG. The newly added member never learns the old/current group keys. This re-keying is necessary to prevent the new member from recording the previous telespace communications and reading them.

Next, the join information encrypted with the new group encryption key and concatenated with an initialization vector 1306 is sent. The contents of this delta are the invitee name concatenated with the invitee certificate and join information. The join information is application-data generated by the chair 902 and pertains to information regarding the new member that the other group members need to know, including member manager information. It may also contain a list of telespace members and various other information, such as the invitee's role assignments.

Finally, a message multi-authentication code 1308 is sent. This can be a concatenation of authenticators between the chair and each member. Each authenticator is hashed information protected in the pairwise authentication key Lod from the chair to the member. The hashed information includes the header 1300, aggregated new group key information 1304 and the unencrypted delta information.

Alternatively, the message authentication code can be the chair's signature of the foregoing hashed information.

Figure 17:
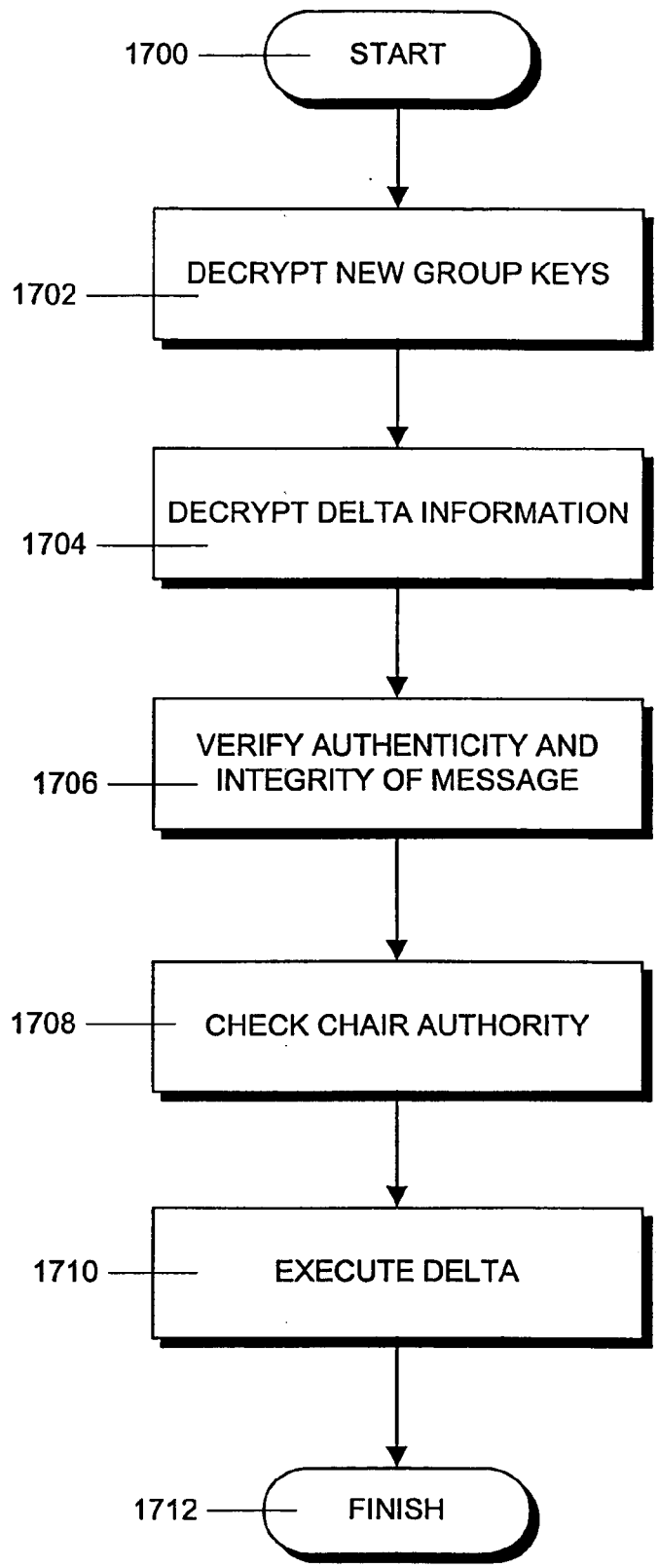
FIG. 17 is a flowchart showing the steps in an illustrative routine that an existing member might use to respond to a new member added delta.

Upon receipt of the message illustrated in FIG. 13, each member 906–910 performs the steps illustrated in the flowchart of FIG. 17. This procedure starts. in step 1700 and proceeds to step 1702 in which the member decrypts the encrypted group keys, thereby learning the new group keys KG/LG. However, each member must retain knowledge of the old/current group keys KG/LG for as long as necessary to ensure that no old deltas protected in KG/Lc still exist. After that, each member must discard the. old keys KG/LG and destroy all traces of them.

Next, in step 1704, each member decrypts the encrypted delta information, thereby learning the information in the delta. In step 1706, the member verifies the authenticity/integrity of the message, via the piece of the multi-authenticator encrypted with its authentication key.

Next, in step 1708, the member checks to make sure that the chair 902 (whose identity is sent as header info) is a chair and is authorized to add a new member.

In step 1710, the member executes the delta information. In the course of doing this, the member becomes aware of the new member manager information including the invitee's name, certificate and the join information. The procedure then finishes in step 1712.

Figure 14:
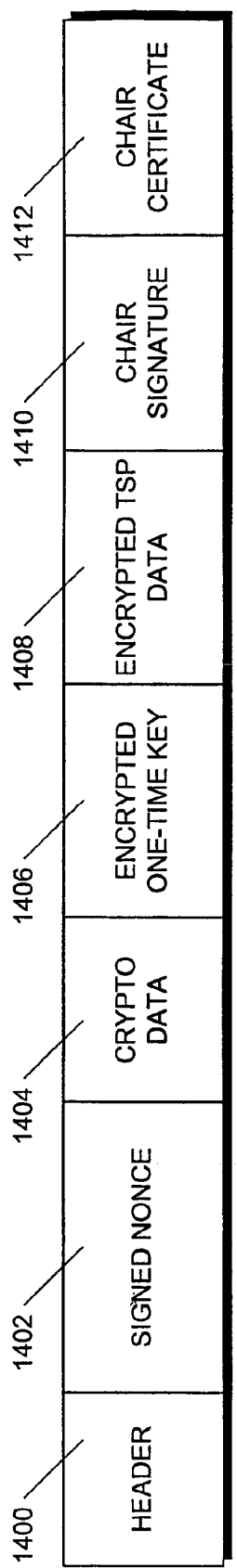
FIG. 14 is a schematic diagram illustrating-the contents of a message sent by the chair to a newly added member informing the member of the telespace data.

Finally, returning to FIG. 10, in step 1008, the chair 902 sends the telespace information to the invitee 904 as indicated schematically by arrow 922. The procedure then finishes in step 1010. The telespace information is sent to the invitee 904 with the message illustrated in FIG. 14. This information begins with a header 1400 followed by the signed acceptance nonce which is the same as nonce 1204. This is followed by the cryptographic data 1404 and encrypted one-time key 1406 (which is newly generated) as described with respect to the acceptance message illustrated in FIG. 12.

The encrypted one-time key 1406 is followed by the telespace (TSP) data encrypted with the one time key in the immediately preceding message portion. This data includes an initialization vector concatenated with a payload encrypted with the one-time key. The payload is the timestamp generated by the invitee, the concatenated group encryption and authentication keys KG/LG and the TSP data. The TSP data is application-data which includes the member's version of the TSP data that the invitee is authorized to receive from the member.

The encrypted TSP data 1408 is followed by the chair's signature 1410 on hashed information including the header, 1400, the invitee's name, the signed nonce 1402, the concatenated group encryption and authentication keys, the unencrypted one-time key, the cryptographic information 1404, and the unencrypted TSPData. Finally, the chair's certificate 1412 follows.

Figure 18:
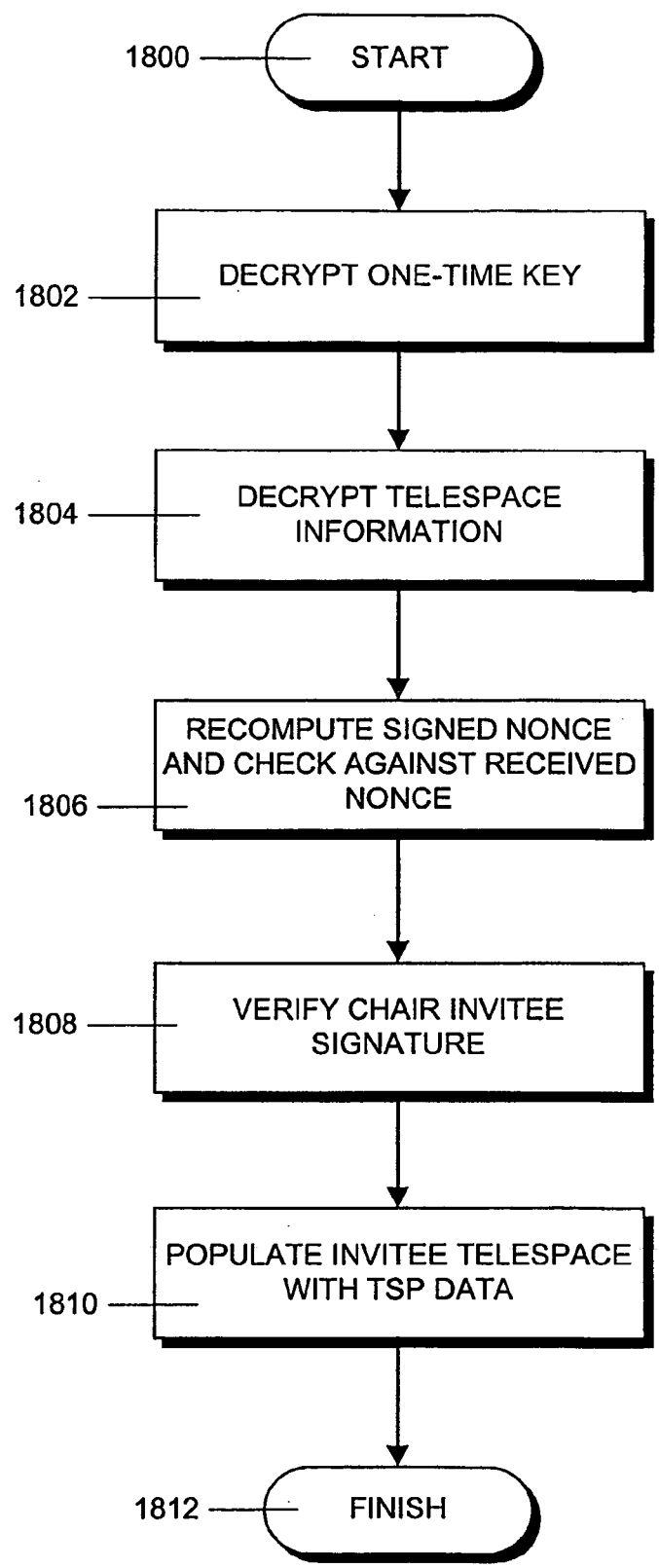
FIG. 18 is a flowchart showing the steps in an illustrative routine that a newly added member might use to respond to a message from the chair conveying telespace information.

Upon receipt of this message, the invitee 904 executes the procedure illustrated in FIG. 18 which begins in step 1800 and proceeds to step 1802 in which the invitee 904 decrypts the encrypted one-time key to retrieve the one-time key.

Next, in step 1804, the invitee uses the one-time key to decrypt the encrypted TSPData, retrieving the TSP information. Then, in step 1806, the invitee 904 recomputes the signed acceptance nonce and compares it against the received nonce to make sure it is acceptable. As previously mentioned, this comparison could be done by software or by visual inspection. Since this nonce contains the chair's certificate, the invitee does not need to revalidate this certificate.

In step 1806, the invitee 904 verifies the chair's signature and, in step 1808, the invitee populates its incipient "telespace-in-the-making" with the decrypted TSPData. The only thing remaining to do is to exchange pairwise keys with all other members of the telespace; after that, the invitee is a full member of the telespace.

Pairwise keys can be exchanged by a re-keying procedure in which re-keying information is "piggybacked" into a delta carrying other information. One protocol for performing this re-keying is discussed above with the New-Member-Added Delta message illustrated in FIG. 13. Re-keying information can also be inserted into other delta messages. Such a piggybacking delta message is a normal delta message, except that a key-change (involving any combination of group/telespace keys (KG/LG), tribe/subgroup keys (KT1/LT1, KTn/LTn, for tribes T1, Tn) and/or pairwise keys (K;j/L;j), simultaneously) is piggybacked along on the delta message. The delta itself is encrypted in the new key appropriate to the tribe Tk at the same time. The new (re-keyed) keys are transported by this message. If pairwise keys are piggybacked along on the message, then the message is protected by a public key signature authenticator.

Otherwise, the message is protected by a multi-authentication code using the current pairwise keys.

Figure 19:
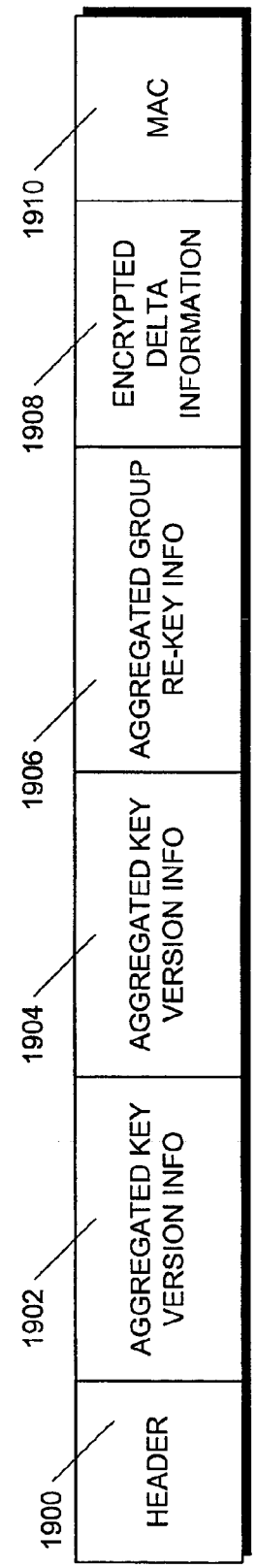
FIG. 19 is a schematic diagram illustrating the contents of a delta message into which re-keying information has been "piggybacked."

An example of such a message is illustrated in FIG. 19. The delta message comprises a header 1900 followed by aggregated key version information 1902 which is the concatenation of all key version numbers for the new group key and all new tribe authentication/integrity keys.

The aggregated key version information 1902 is followed by a second section 1904 that also contains aggregated key version information. If pairwise key changes are being transmitted, then this information includes the concatenation of all key version numbers for the new pairwise keys. Alternatively, if only group and tribe keys are being re-keyed the information 1904 contains the aggregated key version information for the old or current pairwise keys.

The aggregated key version 1904 is followed by aggregated re-key information 1906 that consists of the concatenation of new group and tribe keys (KG/LG and KT/LT). For each member pair, the concatenated group encryption and authentication keys are encrypted using the pairwise key for the member pair and the result is concatenated with an initialization vector. These concatenated keys are then themselves concatenated to form the aggregated re-key information 1906. The new keys replace the old/current group keys KG/LG. If new pairwise keys are being transported, then the aggregated group re-key information is followed by aggregated re-key information for the new pairwise keys. The K/L keys for each member are concatenated and encrypted using the public key of the member. These encrypted keys are then concatenated to form the aggregated pairwise re-key information.

Next, the delta information encrypted with the new group encryption key and concatenated with an initialization vector corresponding to the new key 1908 is sent.

The contents of this delta can be any conventional delta message.

Finally, a message multi-authentication code 1910 is sent. This can be a concatenation of authenticators between the members. Each authenticator is hashed information protected in the pairwise authentication key L;j from the sending member to the receiving member. The hashed information includes the header 1900, aggregated new group key information 1904 (and the aggregated new pairwise key information, if this is being transmitted) and the unencrypted delta information. If pairwise keys are being piggybacked along on the message, then instead of a multi-authentication code, a public-key signature authenticator is sent.

Figure 20:
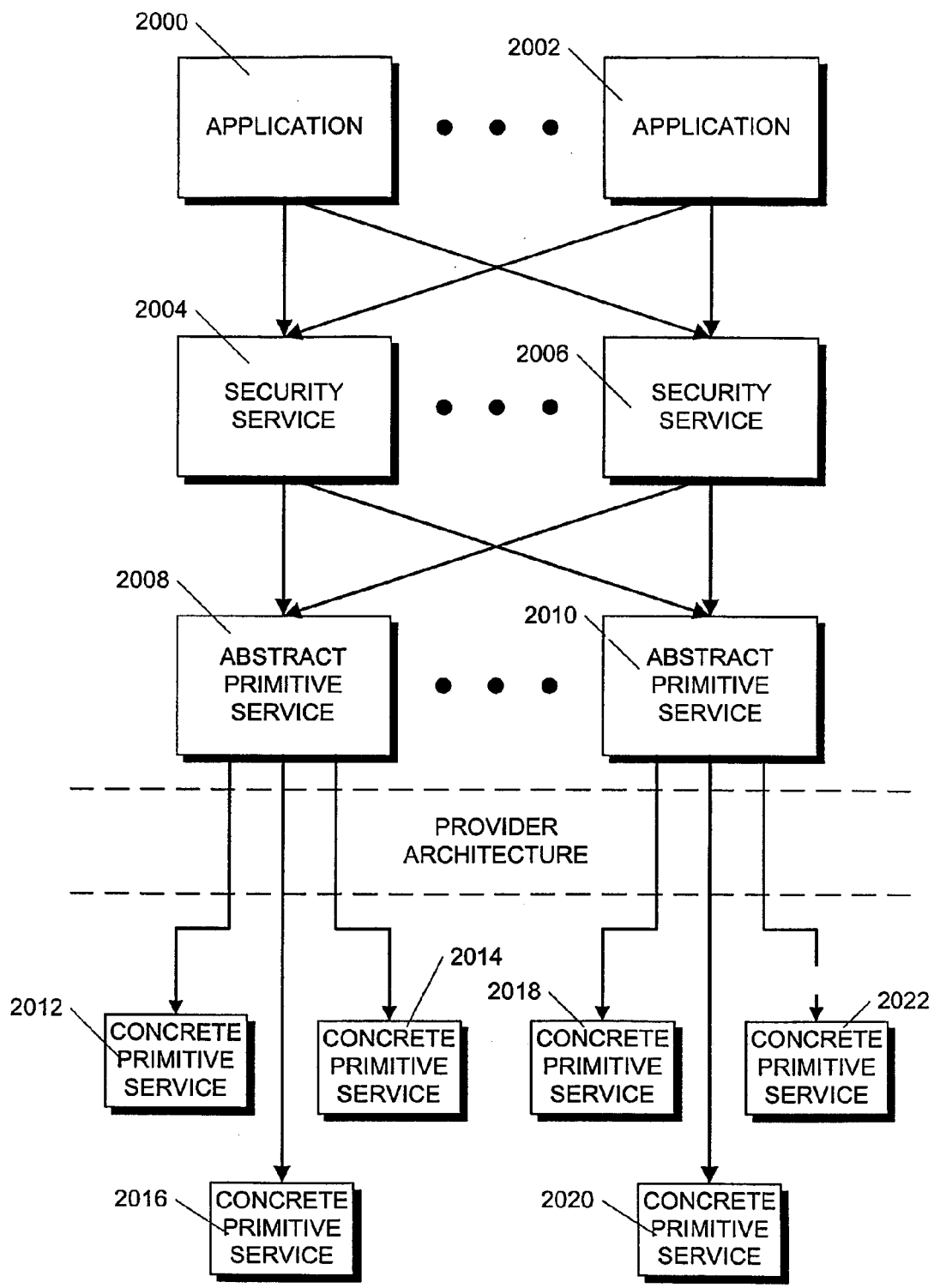
FIG. 20 is a block schematic diagram illustrating the overall architecture of a preferred implementation of the inventive security system.

The aforementioned security system can be implemented in a variety of ways. In a preferred embodiment, the provider architecture shown schematically in FIG. 20 is used. Such an architecture is preferred because the security protocol discussed above is "algorithm-neutral"; that is, it does not depend on specific encryption and protection algorithms. This protocol can take advantage of an algorithm-neutral infrastructure, such as that shown in FIG. 20. FIG. 20 shows a two-dimensional structure consisting of a vertical dimension and a horizontal dimension. The vertical dimension consists of several abstraction layers and the horizontal dimension consists of various applications and services comprising the vertical layers. The topmost layer is an applications layer, including a set of applications, of which applications 2000 and 2002 are shown. These applications could include, but are not limited to, distributed communication and collaboration systems such as the collaboration system discussed above; protected data storage; availability (non-denial of service); system administration; medical information systems; air traffic control systems; nuclear power plants; military intelligence, command and control systems.

Applications 2000 and 2002 access one or more security services, of which services 2004 and 2006 are shown. These services might, for example, include identification; authentication; integrity; confidentiality; privacy; authorization; delegation of authority; accountability and non-repudiation; time stamping; notarization; auditing; trust policy management; intrusion detection and recovery services.

The security services are implemented by a combination of abstract (or algorithm-neutral) primitive services, including abstract primitive services 2008 and 2010. The abstract primitive services are actually implemented by a set of concrete (or algorithm-specific) primitive services. For example, abstract primitive service 2008 may be implemented by concrete primitive services 2012, 2014 and 2016 whereas abstract primitive service 2010 may be implemented by concrete primitive services 2018, 2020 and 2022. These concrete primitive services include services, such as particular cryptographic services and protocols.

Each abstraction layer produces services that are consumed by the higher abstraction layer or layers. In a preferred implementation, the association between the applications 2000, 2002 and the security services 2004, 2006, as well as the association between the security services 2004, 2006 and the abstract primitive services 2008, 2010, are conventional ones that are static compile-time bindings between their layers. But the binding between the abstract primitive services 2008, 2010 and the concrete primitive services (2012, 2014, 2016 and 2018, 2020, 2022) is preferably a dynamic runtime binding that associates, in a constrained way, one abstract primitive service and one or more concrete primitive services. This dynamic binding is referred to as a "provider architecture" and is a mechanism by which the abstract, or algorithm-neutral, primitive services can be implemented by making them with whatever concrete, or algorithm-specific, implementations happen to be active in their environment at a. given time.

FIGS. 21 and 22 schematically illustrate a specific implementation of the provider architecture. Although object-oriented programming techniques have been used in this implementation, those skilled in the art would understand that it could also be implemented with other equivalent techniques and programming languages. In particular, the implementation shown utilizes dynamic linked libraries (DLLs) to provide the various services.

A DLL is depicted in each of FIGS. 21 and 22. The DLL shown in FIG. 21 is called the security services manager (SSM), and the DLL shown in FIG. 22 is called a security service provider (SSP, or just provider). There is always exactly one SSM DLL loaded into any runtime instantiation of the security subsystem. On the other hand, any number of SSP DLLs can be loaded, subject only to the restriction that they are all distinct (in the sense that they all have distinct LIBIDs and file names, as recorded in a file such as a system registry). The names of the SSP DLLs are chosen by their developers. The example SSP DLL shown may be thought of as having a name something like SecProvXXX.dll; other DLLs might be named something like SecYYYProv.dll or ZZZSecProv.dll.

The boxes in FIGS. 21 and 22 denote COM classes that conform to the Microsoft Common Object Model. These classes fall into two groups: engine classes (shown on the right) and non-engine classes (shown on the left). Each of the COM engine classes implements and exports exactly one IDL interface. For example, engine class 2106 (MessageDigest) exports interface 2104 (IMessageDigest); engine class 2118 (KeyGenerator) exports interface 2116 (IKeyGenerator); and engine class 2126 (Cipher) exports interface 2124 (ICipher). This is also true of the Security class 2102 which exports interface 2100. The same is true of the concrete classes illustrated in FIG. 22. For example, concrete engine class 2204 (XXXMessageDigestSpi) exports interface 2206 (IMessageDigestSpi); engine class 2208 (XXXKeyGeneratorSpi) exports interface 2206 (IKeyGeneratorSpi); and engine class 2210 (XXXCipherSpi) exports interface 2212 (ICipherSpi).

It is also true of the Provider/XXXProvider "compound class" formed of provider abstract class 2122 and the XXXProvider concrete class 2200 (FIG. 22). In particular, the Provider class 2122 supports the (Provider interface 2120, and the XXXXProvider class 2200 supports an IProviderCtor interface (not shown in FIG. 22). However, the Provider class 2122 is aggregatable-only inside the XXXProvider class 2200, and hence cannot be independently instantiated. Thus, both the Iprovider 2120 interface and the IProviderCtor interface are "exported" by the Provider/XXXProvider compound class 2122/2200.

The Provider/XXXProvider compound class and all the engine classes shown in FIG. 21 are partnered with one other class (though this may be a many-faceted relationship, since there may be many SSPs configured, each supporting many algorithms) illustrated in FIG. 22. The partner in the SSM DLL (FIG. 21) is referred to as the abstract partner, and the partner in the SSP DLL (FIG. 22) is referred as the concrete partner. On the left side of FIGS. 21, 22 there are two kinds of COM classes called "master" classes; namely the Security class 2102 and the Provider/XXXProvider compound class 2122/2200. The sense in which the Security class 2102 is a "master" class is that it controls the various "slave" Provider/XXXProvider classes. In turn, the sense in which the various Provider/XXXProvider classes are "masters" is that they control the various slave low-level/concrete engine classes. The master classes are mostly security-subsystem-internal and invisible to most applications.

On the right side of FIGS. 21 and 22 there are two kinds of COM classes called engine classes, namely abstract engine classes shown in FIG. 21 and concrete engine classes shown in FIG. 22. An abstract engine class is said to be pure abstract if its m_Engine field holds a zero value. Three kinds of engine classes (MessageDigest, KeyGenerator and Cipher) are shown for illustrative purposes, though their number is unbounded in principle. These engine classes occur in pairs as shown in FIGS. 21 and 22, with the low-level classes contained or encapsulated inside the high-level classes (via the m_Engine member). The function of the high-level engine classes is to export the application programming interfaces (APIs) that the consumers of the security services invoke. The suffix "Spi" occurring on a low-level engine class names stands for service provider interface (or, in the context of security, security provider interface; or sometimes in other contexts, system programming interface), whose only consumers are the high-level engine classes. It is within these low-level engine classes that actual algorithm-specific implementation code resides—this is the ultimate functionality that the "SSP DLL" actually "provides". This split of engine classes into two parts is reflected in the naming structure of the services they support: a fully qualified service name is structured into an abstract/concept prefix and a concrete/algorithm suffix, such as for example: MessageDigest.MD5.

Each concrete SSP (XXXProvider class 2200) contains static information which might include its name (s_MyName, a string), version (s_MyVersion, a number), class ID (s_MyClsid, a 16-byte binary value), information (s_MyInfo, a string), and the list of services bundled into its DLL (s_MySvcMap [ ], a list of pairs of strings). In each entry of s_MySvcMap [ ], one string is the name of the algorithm that the service implements, and the other is the COM CLSID (class ID) of the concrete engine class (bundled into SecProvXXX.dll) that implements that algorithm.

In addition to its engine classes, the security subsystem contains a number of non-engine classes. Two typical ones, Key and KeyPair, are shown in FIG. 21. As the illustration indicates, such non-engine classes are relatively normal COM classes, whose only unusual feature is that the (abstract) interface class and the (concrete) implementation class may (or may not) be split between the SSM DLL (FIG. 21) and the SSP DLL (FIG. 22). For example, in the case of the Key class 2110, the SSM only has general a priori (interface) knowledge of what a given SSP's keys should look like, but it is the SSP itself that must supply a detailed implementation of the Key class, conforming to the interface defined by the SSM for example, by the XXXKey class 2210. However, in the case of the KeyPair class 2114, the SSM already has detailed knowledge of its implementation—it consists of a pair of Keys (whatever those might be).

When the security subsystem is booted, for example, when the Security class 2102 is first CoCreated in a runtime, the Security class 2102 does the following in the Security class FinalConstruct( ) method. First, the Security class 2102 reads configuration information that might be stored, for example, in a Registry.

Next, based on the ProgID (or CLSID) of each configured concrete provider XXXProvider (as just read from the Registry), the security class CoCreates an instance of XXXProvider 2200, getting a pointer to XXXProvider's IProviderCtor interface (Ctor stands for constructor). This act of CoCreating an XXXProvider class further CoCreates and aggregates in XXXProvider's FinalConstruct( ), an object of the abstract Provider class insider XXXProvider 2200.

Next, using XXXProvider's IProviderCtor* interface that it just CoCreated, the Security class 2102 invokes XXXProvider's no-arg-Ctor( ) method from the IProviderCtor interface. This special no-arg-Ctor( ) method "uploads" XXXProvider's name/version/info/cisid/service data from their "hardwired" static number-variable locations into non-static member variables in the aggregated Provider object (the noarg-Ctor( ) method accomplishes this by invoking certain methods exported by the XXXProvider's aggregated Provider subobject).

Fourth, the Security class 2102 constructs its static internal configuration list, s_ProvList [ ], of (Provider*'s pointing to the various configured concrete providers. The Security class 2102 constructs each Iprovider* by calling the Queryinterface method in XXXProvider's IProviderCtor* interface that the Security class 2102 has been using to this point. The lists—ProvList [ ] of configured SSPs is made available to clients via the getProviders( ) method of the Security class 2102.

Applications actually use the provider architecture in the following manner.

Consider an application that wants to invoke a digest( ) method on a MessageDigest object to actually compute the digest of a specified message (buffer). The application is aware of the abstract engine classes in the SSM (i.e., CLSIDs of the classes in SecuritySvcs.dll) because it was linked with this information during creation, but it does not know a priori about the concrete engine classes in SSPs (i.e., the CLSIDs of the classes in SecProvXXX.dll), where the real algorithm implementation actually resides. Therefore, the application can directly CoCreate an abstract engine object, but cannot directly CoCreate a concrete engine object. However, in accordance with a preferred embodiment, an abstract engine object is treated as a class factory object having a factory method, called getInstance( ), to indirectly create a concrete engine object, as follows.

The application begins by CoCreating a pure abstract MessageDigest object from the MessageDigest class 2106. Such an object cannot be used to create a digest because it is not connected to a concrete engine object—that is, its main state variable, m_Engine, has a zero value (as do its minor state variables, m_AlgName and m_ProvName). Using the IMessageDigest* interface 2104 it just CoCreated, the application then invokes MessageDigest's getInstance( ) method, specifying the well known name of the message digest algorithm it wants to use. The getInstance( ) method is a factory method, which performs the following steps. First, the getInstance( ) method invokes the getproviders( ) method in the Security object to fetch the list of providers that are currently configured. Next, the getInstance( ) method uses the list of SSPs it just fetched to invoke each SSP's get( ) method, in preference rank order, until it finds the first SSP that support the requested algorithm. The SSP's get( ) method maps algorithm names to concrete engine class ProgIDs, using the SSP's m_SvcMap [ ]. Thus in this example, the get( ) method in class 2022 returns the ProgID of a MessageDigestSpi concrete engine class that supports the requested algorithm.

Next, the getInstance( ) method CoCreates a new abstract MessageDigest object distinct from the MessageDigest object from which the getInstance( ) method is being invoked. Initially, this new MessageDigest object is another pure abstract engine object, but in the next step the getInstance( ) method will morph it into a complete/connected engine object (i.e., a "non-pure" abstract engine object together with a concrete engine contained/composed inside it via its m_Engine field).

Finally, the getInstance( ) method invokes the new MessageDigest object's constructor( ) method, passing as a parameter the MessageDigestSpi CLSID (or ProgID) it obtained from the get( ) method call above. That constructor( ) method CoCreates an instance of the MessageDigestSpi object from class 2104, and populates the new MessageDigest's m_Engine field with the resulting IMessageDigestSpi* pointer. Thus, the getInstance( ) method returns to the application a fully complete/connected MessageDigest engine object. At that point, the application can invoke the engine object's digest( ) method to compute the digest of a message. The (abstract) engine object's digest( ) method then delegates or forwards the invocation to its concrete engine object's engineDigest( ) method to perform the actual work.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention.

Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable medium with accompanying printed or electronic documentation, e.g., shrink wrapped software, pre-loaded with a computer system, e.g., on system ROM or fixed disk, or distributed from, a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular hardware system and operating system, other hardware and operating system software could be used in the same manner as that described. Other aspects, such as the specific instructions utilized to achieve a particular function, as well as other modifications to the inventive concept are intended to be covered by the appended claims.

What is claimed is:

1. A method for distributing new keys to a secure group of collaborators who communicate via messages containing data and protected with a group encryption key and inter-member keys, the method comprising:

(a) encrypting data for a data message to be sent from a first member to a second member with a new group encryption key;
(b) encrypting the new group encryption key with an inter-member key between the first and the second member;
(c) piggybacking the encrypted new group encryption key on the data message; and
(d) protecting the data message with the new group encryption key.

2. The method of claim 1 further comprising inserting a key version number for the new group encryption key into the data message.

3. The method of claim 1 further comprising concatenating new key version numbers for all new inter-member keys when new inter-member keys are being distributed and inserting the new key version concatenation into the data message and concatenating old key version numbers for all old inter-member keys when new inter-member keys are not being distributed and inserting the old key version concatenation into the data message.

4. The method of claim 1 further comprising encrypting the new group encryption key with an inter-member key between each pair of members in the group, concatenating the encrypted group encryption keys and inserting the concatenation into the data message.

5. The method of claim 3 further comprising encrypting the new inter-member encryption keys between each pair of members in the group with a public key of each member, concatenating the encrypted inter-member encryption keys and inserting the concatenation into the data message.

6. Apparatus for distributing new keys to a secure group of collaborators who communicate via messages containing data and protected with a group encryption key and inter-member keys, comprising:
a first encryption module that encrypts data for a data message to be sent from a first member to a second member with a new group encryption key;
a second encryption module that encrypts the new group encryption key with an inter-member key between the first and the second member;
a protocol engine that piggybacks the encrypted new group encryption key on the data message; and
a third encryption module that protects the data message with the new group encryption key.

7. The apparatus of claim 6 further comprising a versioning mechanism that inserts a key version number for the new group encryption key into the data message.

8. The apparatus of claim 7 further comprising an aggregate key version mechanism that concatenates new key version numbers for all new inter-member keys when new inter-member keys are being distributed and inserts the new key version concatenation into the data message and concatenates old key version numbers for all old inter-member keys when new inter-member keys are not being distributed and inserts the old key version concatenation into the data message.

9. The apparatus of claim 6 further comprising a first key generator that encrypts the new group encryption key with an inter-member key between each pair of members in the group, concatenates the encrypted group encryption keys and inserts the concatenation into the data message.

10. The method of claim 8 further comprising a second key generator that encrypts the new inter-member encryption keys between each pair of members in the group with a public key of each member, concatenates the encrypted inter-member encryption keys and inserts the concatenation into the data message.

11. A computer program product for distributing new keys to a secure group of collaborators who communicate via messages containing data and protected with a group encryption key and inter-member keys, the computer program product comprising a computer usable medium having computer readable program code thereon, including:
program code for encrypting data for a data message to be sent from a first member to a second member with a new group encryption key;
program code for encrypting the new group encryption key with an inter-member key between the first and the second member;
program code for piggybacking the encrypted new group encryption key on the data message; and
program code for protecting the data message with the new group encryption key.

* * * * *